(12) United States Patent
Koyama et al.

(10) Patent No.: US 6,176,585 B1
(45) Date of Patent: Jan. 23, 2001

(54) PROJECTION APPARATUS

(75) Inventors: Osamu Koyama, Hachioji; Junko Kuramochi, Yokohama; Saburo Sugawara, Kawasaki, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/965,300

(22) Filed: Nov. 6, 1997

(30) Foreign Application Priority Data

| Nov. 6, 1996 | (JP) | 8-310025 |
| Nov. 11, 1996 | (JP) | 8-314241 |
| Nov. 18, 1996 | (JP) | 8-322282 |
| Nov. 18, 1996 | (JP) | 8-322283 |

(51) Int. Cl.[7] ................................................ G03B 21/28
(52) U.S. Cl. ........................... 353/31; 353/37; 353/98
(58) Field of Search ................................... 353/31, 34, 37, 353/30, 84, 98, 99; 349/8, 5; 359/634, 567

(56) References Cited

U.S. PATENT DOCUMENTS

| 5,264,880 | * | 11/1993 | Sprague et al. | 353/31 |
| 5,305,029 | | 4/1994 | Yoshida et al. | |
| 5,311,227 | * | 5/1994 | Takayasu et al. | 353/37 |
| 5,467,206 | * | 11/1995 | Loiseaux et al. | 349/5 |
| 5,548,349 | * | 8/1996 | Mizuguchi et al. | 349/5 |
| 5,566,007 | * | 10/1996 | Ikeda et al. | 349/5 |
| 5,623,349 | * | 4/1997 | Clarke | 349/8 |
| 5,626,409 | * | 5/1997 | Nakayama et al. | 353/34 |
| 5,648,860 | * | 7/1997 | Ooi et al. | 353/34 |
| 5,651,598 | * | 7/1997 | Yoshida et al. | 353/34 |
| 5,777,789 | * | 7/1998 | Chiu et al. | 353/34 |
| 5,801,795 | * | 9/1998 | Ogino et al. | 349/5 |

FOREIGN PATENT DOCUMENTS 6-265842   9/1994   (JP) .

* cited by examiner

Primary Examiner—William Dowling
(74) Attorney, Agent, or Firm—Morgan & Finnegan LLP

(57) ABSTRACT

There is disclosed an image projection apparatus which comprises separating a light beam from a light source into plural color lights by color separation means, respectively condensing the separated plural color lights, providing first deflection means in the vicinity of at least one of condensed positions to guide the color lights to optical modulation elements respectively corresponding thereto, and projecting image information, based on the optical modulation elements, onto a predetermined plane through a projection optical system.

49 Claims, 22 Drawing Sheets

PROJECTION APPARATUS

BACKGROUND OF THE INVENTION

1. Field of the Invention

The present invention relates to a projection apparatus, adapted for use for example in a color liquid crystal projector which projects image information, displayed on an optical modulating element such as a color liquid crystal display panel, onto a screen in a magnified manner.

2. Related Background Art

There have been proposed various color liquid crystal projectors, which projects the optical information, displayed on a liquid crystal panel serving as an optical modulating element, onto a screen. Among such projectors, an optical system for use in a liquid crystal projector employing a transmissive liquid crystal apparatus is disclosed for example in the Japanese Patent Laid-open Application No. 61-99118. FIG. 28 is a schematic view of the optical system proposed in the above-mentioned patent application.

Referring to FIG. 28, the light emitted from a light source 1 is converted by a reflector (parabolic mirror) 2 into a substantially parallel light beam, which then enters a dichroic mirror 34 transmitting the green (G) light and reflecting the green (G) and red (R) lights. The G and R lights reflected by the dichroic mirror 34 enters a dichroic mirror 35, which reflects the green (G) light and transmits the red (R) light. The G light beam reflected by the dichroic mirror 35 illuminates a liquid crystal panel 14 for the G light while the R light beam transmitted by the dichroic mirror 35 illuminates a liquid crystal panel 15 for the R light. Also the blue light beam transmitted by the dichroic mirror 34 illuminates, via mirror 36, a liquid crystal panel 16 for the B light. The light beams transmitted by the liquid crystal panels 14, 15, 16 are respectively modulated by the image information of respective colors. The light beams from the liquid crystal panels 14, 16 are synthesized by a dichroic mirror 37 which transmits the blue light beam and reflects the green light beam. Also the red light beam from the liquid crystal panel 15 enters, via a mirror 38, a dichroic mirror 38 which transmits the red light beam and reflects the blue and green light beams.

The red, blue and green light beams are synthesized by the dichroic mirror 39 to provide a full color image, which is projected through a projection optical system 22 onto a screen 23. In the liquid crystal panels 14, 15, 16 there is employed, for example, twisted nematic (TN) liquid crystal or super-twisted nematic (STN) liquid crystal.

FIG. 29 is a schematic view of an optical system for a color liquid crystal projector, employing the transmissive liquid crystal apparatus, as proposed in the Japanese Patent Laid-open Application No. 1-131593.

Referring to FIG. 29, the light emitted from a light source 1 is converted by a reflector (parabolic mirror) 2 into a substantially parallel light beam, which then enters a dichroic mirror 341 reflecting the blue (B) and transmitting the green (G) and red (R) lights. The light beam transmitted by the dichroic mirror 341 enters a dichroic mirror 35', which transmits the green light and reflects the red light. The green light beam transmitted by the dichroic mirror 35' illuminates a liquid crystal panel 14 for the green light while the red light beam reflected by the dichroic mirror 35' illuminates, via mirrors 38, 41, a liquid crystal panel 15 for the red light. Also the blue light beam reflected by the dichroic mirror 34' illuminates, via mirrors 36, 40, a liquid crystal panel 16 for the blue light.

The light beam transmitted by the liquid crystal panels 14, 15, 16 are respectively modulated by the image information of respective colors, and enter a cross dichroic prism 42 wherein they are synthesized as a full-color image. The cross dichroic prism 42 is composed of a cross-shaped combination of a dichroic mirror transmitting the green light beam and reflecting the blue light beam and a dichroic mirror transmitting the green light beam and reflecting the red light beam. The full-color image synthesized in the cross dichroic prism 42 is projected through a projection optical system 22 onto a screen 23.

FIG. 30 is a schematic view of an optical system for a color liquid crystal projector, employing a reflective liquid crystal apparatus, as disclosed in the Japanese Patent Laid-open Application No. 6-265842. This optical system is called a Schlieren optical system.

Referring to FIG. 30, the light emitted from a light source 1 is converted by a reflector (parabolic mirror) 2 into a substantially parallel light beam, then reflected by a mirror 36, and is condensed by a condenser lens 4 so as to form an image of the light source in the vicinity of a mirror 43 positioned at a diaphragm aperture of the projection optical system 22. The light beam reflected by the mirror 43 is emitted toward a plano-convex lens 44, converted therein into a parallel light beam, then separated by a cross dichroic prism 42 into the light beams of three colors which respectively illuminate reflective liquid crystal panels 25, 26, 27 of the respective wavelength regions.

The light beams respectively modulated by the reflective liquid crystal panels 25, 26, 27 are synthesized by a cross dichroic prism 42 into a full-color image, which is condensed by a plano-convex lens 44, then transmitted by a diaphragm 28 and projected through a projection optical system 22 onto a screen 23.

The liquid crystal panel contains, for example, polymer liquid crystal of dispersion type, which becomes transparent in case of displaying a white level, thereby reflecting the light beam, but scatters the light beam in case of displaying a black level. The light reflected by the liquid crystal panels and color synthesized by the cross dichroic prism 42 is condensed by the plano-convex lens 44 in the vicinity of the diaphragm 28 of the projection optical system 22. The light beam reflected by the liquid crystal panel is mostly transmitted by the aperture of the diaphragm 28 and displays the white level on the screen 23 through the projection optical system 22, while the light beam scattered by the liquid crystal panel is transmitted, only by a very limited portion, by the aperture of the diaphragm 28, thereby displaying the black level on the screen 23.

As explained in the foregoing, the light scattering in the liquid crystal is utilized to display the image information, which is projected by the projection optical system onto the screen.

FIGS. 31A and 31B are respectively an entire view and a schematic partial view of a color liquid crystal projector proposed in the Japanese Patent Laid-open Application No. 4-428, wherein liquid crystal panels 14, 15, 16 are respectively illuminated with the R, G and B lights. The light beams from the liquid crystal panels, illuminated with the respective color lights are condensed by auxiliary lenses 17, 18, 19 in the vicinity of the entrance pupil EnP of a projection lens 30. The light beam from the auxiliary lens 18 is directly entered into a projection optical system 22, while that from the auxiliary lens 17 is guided thereto via a mirror 20, and that from the auxiliary lens 19 is guided thereto via a mirror 21. The projection optical system 22 projects images, displayed on the liquid crystal panels 14, 15, 16 onto a screen 23.

In FIGS. 31A and 31B, there are illustrated principal rays Pr1, Pr2, Pr3 at the center for the respective projection systems, and three rays for each of the projection systems. The optical axis of the auxiliary lens 18 of the central projection system B coincides with that of the projection lens 32, and the optical axes of the auxiliary lenses 17, 19 of the peripheral projection systems A, C are perpendicular to the optical axis of the projection lens.

The entrance pupil EnP of the projection lens is positioned at the crossing point of the optical axes of the three auxiliary lenses, and the mirrors 20, 21 are so positioned that the end points thereof at the center side coincide with the entrance pupil EnP and are inclined by 45° with respect to the optical axis of the projection lens 32.

In the central projection system B, the liquid crystal display panel is so positioned that the central axis thereof coincides with the optical axis of the auxiliary lens 18, while, in the peripheral projection systems A and C, the liquid crystal display panels are so positioned that the central axes thereof are shifted toward the left-hand side in the drawings, with respect to the optical axes of the respective auxiliary lenses.

Consequently the principal ray Pr2 of the central projection system B passes the optical axis of the projection optical system 22 and becomes perpendicular to the screen 23, while the principal rays Pr1, Pr3 of the peripheral projection systems A, C become oblique to the screen 23. The three principal rays mutually cross on the screen.

FIG. 32 is a schematic view of a color image projection apparatus disclosed in the U.S. Pat. No. 5,108,172, wherein the white light from a lamp 238 is guided, in respective color channels, into corresponding lens means 210 (210', 210"). For example, in the red channel, the white light is condensed by the lens means in the vicinity of an apertured mirror 214, then reflected by the mirror 214, converted into a parallel light beam by a field lens 216 and introduced into a reflective liquid crystal panel 218, and the light bearing the image information, reflected from the panel 218, is condensed by a lens 216 in the vicinity of the mirror 214 in such a manner that the non-scattered light (normal reflected light) in the reflected light passes through the aperture of the mirror 214 while a major portion of the scattered light in the reflected light does not enter the aperture of the mirror 214.

The non-scattered light of the red channel is guided by a mirror 242, reflected to a dichroic mirror 244 and introduced into a dichroic mirror 246. Also the green light is guided, through a similar optical path and through a dichroic mirror 244 and introduced into the dichroic mirror 246, and the blue light is also introduced into the dichroic mirror 246. Then an image represented by the lights synthesized by the dichroic mirrors 244, 246 is displayed by a projection lens 240 onto a screen.

In the image projection apparatus shown in FIG. 32, a color filter is provided in the optical path of each channel, in order to provide the non-scattered light of each color channel with a corresponding color, and, since such color filter absorbs the light of other colors, the major portion of the light emitted from the lamp is wasted. Consequently the efficiency of utilization of the light from the lamp tends to become low, and it is difficult to obtain a bright image.

SUMMARY OF THE INVENTION

The object of the present invention is to provide an image projection apparatus capable of providing a bright image.

According to a first aspect of the present invention, there is provided an image projection apparatus for effecting color separation on the light beam from light source means into plural color lights, respectively condensing thus color-separated plural color lights, providing first deflection means in the vicinity of at least one of the condensed positions to guide the color lights to optical modulation elements respectively corresponding thereto and projecting the image information, based on the respective optical modulation elements, onto a predetermined plane through a projection optical system.

According to a second aspect of the present invention, there is provided an image projection apparatus for effecting color separation on the light beam from light source means into plural color lights, respectively condensing thus color-separated plural color lights, providing first deflection means in the vicinity of at least one of the condensed positions to guide the color lights to optical modulation elements respectively corresponding thereto, guiding the light beam based on at least an optical modulation element to a projection optical system by second deflection means and projecting the image information, based on the respective optical modulation elements, onto a predetermined plane in a mutually superposed manner through the projection optical system, wherein the second deflection means is so positioned in the vicinity of the diaphragm of the projection optical system as to divide the aperture of the diaphragm into plural areas.

According to a third aspect of the present invention, there is provided an image projection apparatus for effecting color separation on the light beam from light source means into plural color lights, respectively condensing thus color-separated plural color lights, providing first deflection means in the vicinity of at least one of the condensed positions to guide the color lights to reflective optical modulation elements respectively corresponding thereto, guiding the light beam based on at least an optical modulation element to a projection optical system by second deflection means and projecting the image information, based on the respective optical modulation elements, onto a predetermined plane in a mutually superposed manner through the projection optical system, wherein the first and second deflection means are so positioned in the vicinity of the diaphragm of the projection optical system as to divide the aperture of the diaphragm into plural areas.

According to a fourth aspect of the present invention, there is provided an image projection apparatus for effecting color separation on the light beam from light source means into plural color lights, respectively condensing thus color-separated plural color lights, providing a mirror or mirrors in the vicinity of at least one of the condensed positions to guide the color lights to reflective optical modulation elements respectively corresponding thereto, guiding the light beam based on at least an optical modulation element to a projection optical system by second deflection means and projecting the image information, based on the respective optical modulation elements, onto a predetermined plane in a mutually superposed manner through the projection optical system, wherein the mirrors and the second deflection means are so positioned in the vicinity of the diaphragm of the projection optical system as to divide the aperture of the diaphragm into plural areas, and at least one of the mirrors is so positioned that a plane containing the normal line to the mirror is positioned in an area out of parallel and perpendicular planes to the optical modulation elements.

According to a fifth aspect of the present invention, there is provided an image projection apparatus for effecting color separation on the light beam from light source means into plural color lights, respectively condensing thus color-separated plural color lights, providing a mirror or mirrors in the vicinity of at least one of the condensed positions to guide the color lights to optical modulation elements respectively corresponding thereto, guiding the light beam based on at least an optical modulation element to a projection optical system by second deflection means and projecting the image information, based on the respective optical modulation elements, onto a predetermined plane in a mutually superposed manner through the projection optical system, wherein the mirror and the second deflection means are so positioned in the vicinity of the diaphragm of the projection optical system as to divide the aperture of the diaphragm into plural areas, and the plural mirrors are so positioned that planes containing the normal lines to the mirrors are positioned in an area of parallel or perpendicular planes to the optical modulation elements.

Also the image projection apparatus of the present invention, according to the first to fifth aspects mentioned above, includes the following embodiments:

wherein the means for the above-mentioned color separation is a transmissive diffraction grating;

wherein the means for the above-mentioned color separation is a reflective diffraction grating;

wherein the means for the above-mentioned color separation is composed of plural dichroic mirrors provided in mutually inclined manner;

wherein the means for the above-mentioned color separation is provided in a parallel light beam;

wherein the means for the above-mentioned color separation effects color separation in such a manner that a green light beam is positioned at the center and red and blue light beams are positioned at the peripheries thereof;

wherein the above-mentioned reflective diffraction grating is used under the condition of conical diffraction;

wherein the above-mentioned plural dichroic mirrors do not have the light beam separating direction in the light beam deflecting plane;

wherein, among the above-mentioned plural dichroic mirrors, the last one receiving the incident light beam is a dichroic mirror reflecting the green light;

wherein the above-mentioned first deflection means includes a mirror prism which reflects two color lights at both sides in the spectrum among the three color lights separated by the color separation means and emerging at different angles;

wherein the above-mentioned first deflection means includes plural mirrors for reflecting the light beams;

wherein the above-mentioned first deflection means includes plural prisms for refracting the light beams;

wherein the above-mentioned second deflection means includes plural mirrors for reflecting the light beams;

wherein the above-mentioned second deflection means includes plural prisms for refracting the light beams;

wherein, in the optical path of the color lights, there is provided a lens system for guiding parallel light beams to the respective optical modulation elements;

wherein at least one of the above-mentioned optical modulation elements receives the light beam in an oblique direction;

wherein the above-mentioned reflective optical modulation elements have a rectangular shape and at least one of the optical modulation elements receives the light beam obliquely to the direction of the longer side and to that of the shorter side;

wherein the above-mentioned mirror includes a mirror of high reflectivity optimized to the wavelength region to be reflected;

wherein the above-mentioned plural mirrors are mirrors of a high reflectivity optimized to the wavelength regions to be reflected;

wherein the above-mentioned second deflection means includes mutually spaced plural mirrors which are provided in inclined positions;

wherein the above-mentioned second deflection means includes mutually spaced plural mirrors which are provided in inclined positions, and at least one of the plural color lights enters the projection optical system through a gap among the mutually spaced plural mirrors;

wherein the above-mentioned second deflection means includes mutually spaced plural mirrors which are provided in inclined positions, and at least one of the plural color lights is reflected by one of the mutually spaced plural mirrors which are provided in inclined positions and enters the projection optical system;

wherein the above-mentioned second deflection means includes mutually spaced two mirrors which are provided in inclined positions, and such two mirrors mutually form an angle other than 90°;

wherein, in the optical path from the above-mentioned optical modulation elements, there is provided a lens for condensing the light beams from the optical modulation elements in the vicinity of the position of the diaphragm of the projection optical system;

wherein the optical modulation element utilizes a polymer dispersion liquid crystal;

wherein the optical modulation element utilizes a polymer dispersion liquid crystal apparatus;

wherein the optical modulation element utilizes a polymer dispersion reflective liquid crystal apparatus;

wherein the above-mentioned mirrors are adapted to compensate the difference in the diffraction angle, depending on the peak wavelength of the diffracted light beam, of the diffraction gratings constituting the color separation means, thus guiding the light beams with a same inclination to the optical modulation elements;

wherein the diaphragm of the projection optical system is positioned between the projection optical system and the optical modulation elements;

wherein the first and second deflection means are respectively provided in two areas formed by dividing the aperture of the diaphragm of the projection optical system; and/or wherein the first and second deflection means are respectively provided in two areas, including the optical axis of the projection optical system and formed by dividing the aperture of the diaphragm of the projection optical system.

Also according to a sixth aspect of the present invention, there is provided an image projection apparatus for condensing a light beam from light source means by condensing means, introducing the light beam into a first end face of an integrator, causing the light beam to emerge from a second end face thereof, separating the light beam emerging from the second end face into plural color lights with color separation means, respectively condensing thus separated plural color lights, guiding the color lights to optical modulation elements respectively corresponding thereto with a mirror or mirrors provided in the vicinity of at least one of the condensed positions, guiding the light beam based on at least one of the optical modulation elements to a projection optical system with second deflection means, and projecting the image information, based on the respective optical modulation elements, by the projection optical system onto a predetermined plane in superposed manner, wherein the mirrors and the second deflection means are so positioned in the vicinity of the diaphragm of the projection optical system as to divide the aperture of the diaphragm into plural areas, while the integrator is composed of a reflecting face connecting the first and second end faces, and an optical system is provided in the optical path between the second end face and the optical modulation elements in such a manner as to maintain an optically conjugate relationship between the first end face and the diaphragm of the optical projection system and between the second end face and the optical modulation elements.

Also the image projection apparatus according to the sixth aspect mentioned above includes the following embodiments:

wherein the light beams from the optical modulation elements are condensed in the vicinity of the position of the diaphragm of the projection optical system by lenses provided respectively corresponding to the optical modulation elements;

wherein the integrator is composed of a hexahedral glass block, wherein a part of the light entering from the first end face of the integrator is guided by total reflection to the second end face;

wherein the integrator is composed of a kaleidoscope composed of four or more trapezoidal or rectangular flat mirrors, wherein a part of the light entering from the first end face of the integrator is reflected by such flat mirrors and guided to the second end face;

wherein the first and second deflection means are respectively provided in two areas formed by dividing the aperture of the diaphragm of the projection optical system;

wherein the first and second deflection means are respectively provided in two areas, including the optical axis of the projection optical system and formed by dividing the aperture of the diaphragm of the projection optical system;

wherein the mirror means and the second deflection means are respectively provided in two areas formed by dividing the aperture of the diaphragm of the projection optical system; and/or wherein the mirror means and the second deflection means are respectively provided in two areas, including the optical axis of the projection optical system and formed by dividing the aperture of the diaphragm of the projection optical system.

According to a seventh aspect of the present invention, there is provided an image projection apparatus for separating a light beam from light source means into a R color light beam, a G color light beam and a B color light beam, respectively condensing thus separated color lights, guiding the color lights to optical modulation elements respectively corresponding thereto by providing first deflection means in the vicinity of at least one of the condensed positions, guiding the image information based on at least one of the optical modulation elements to a projection optical system by second deflection means, and porjecting the image information, based on the optical modulation elements, by the projection optical system onto a predetermined plane in mutually superposed manner, wherein the color separation means is so pstitioned as to respectively separate the R and B light beams on both sides of the G light beam at the center, while the second deflection means is so positioned in the vicinity of the diaphragm of the projection optical system as to divide the aperture of the diaphragm into three areas, whereby the G light beam passes through the central one of thus divided three areas while the R and B light beams pass through the peripheral ones of the divided three areas.

According to the eighth projection apparatus, the color separation optical system comprises plural dichroic mirrors provided in mutually inclined manner and adapted to separate an incident light beam into plural color lights and to emit thus separated color lights, wherein said plural dichroic mirrors are so positioned as not to have the direction of light beam separation in the plane of deflection of the light beams.

According to a ninth aspect of the present invention, there is provided an image projection apparatus comprising plural dichroic mirrors which are positioned in mutually inclined manner to separate the incident light beam into plural color lights wherein the plural dichroic mirrors are so positioned as not to have the light beam separating direction in the light beam deflecting plane and the dichroic mirror receiving the incident light beam last is adapted to reflect the green light beam.

DESCRIPTION OF THE PREFERRED EMBODIMENTS

Figure 1:
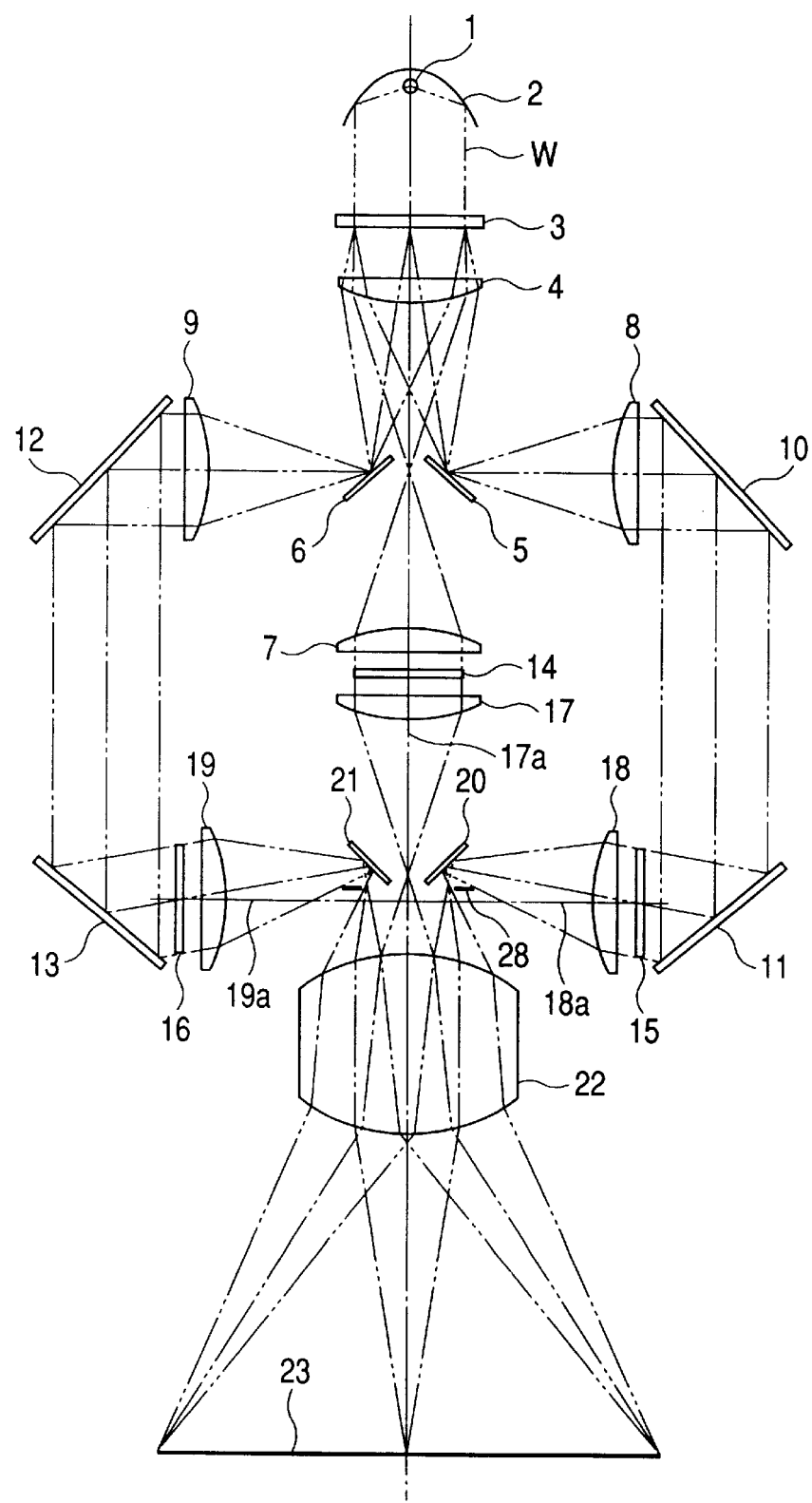
FIG. 1 is a schematic view of an embodiment 1 of the present invention.
Figure 2:
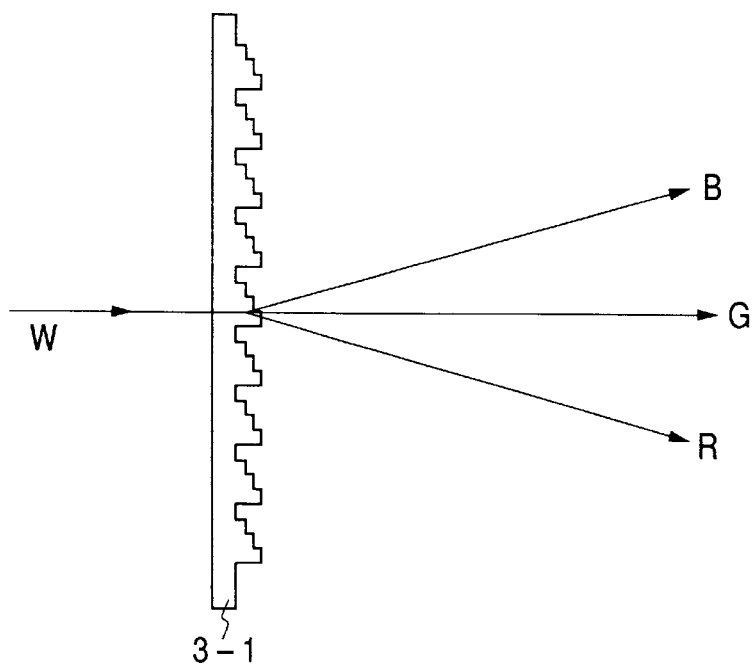
FIG. 2 is a schematic view of color separation means shown in FIG. 1.

FIG. 1 is a schematic view of an embodiment 1 of the present inveniton, and FIG. 2 is a partial view of FIG. 1. The present embodiment shows the application to a color liquid crystal projector, employing transmissive liquid crystal panels (hereinafter also called simply "liquid crystal") as the optical modulation elements.

Referring to FIG. 1, the white light W emitted from a light source 1 is reflected and converted by a reflector (parabolic mirror) 2 into a substantially parallel light beam, which is then separated, by a color separation element 3, into light beams corresponding to plural wavelength regions (for example red (R) colored light, green (G) colored light and blue (B) colored light, which are hereinafter represented as R light, G light and B light).

FIG. 2 is a schematic cross-sectional view of the color separation element employed in the present embodiment. The color separation element of the present embodiment is composed of a transmissive step-shaped diffraction grating 3-1. As shown in FIG. 2, the white light W entering the diffraction grating 3-1 is separated, upon transmission, into 0th- and ±first-order diffracted lights showing the peaks of diffraction efficiency at the specific wavelength regions, owing to the difference in the optical path length created by the fine step-shaped translucent structures, whereby emitted are light beams of the wavelength regions of red, green and blue.

Figure 3:
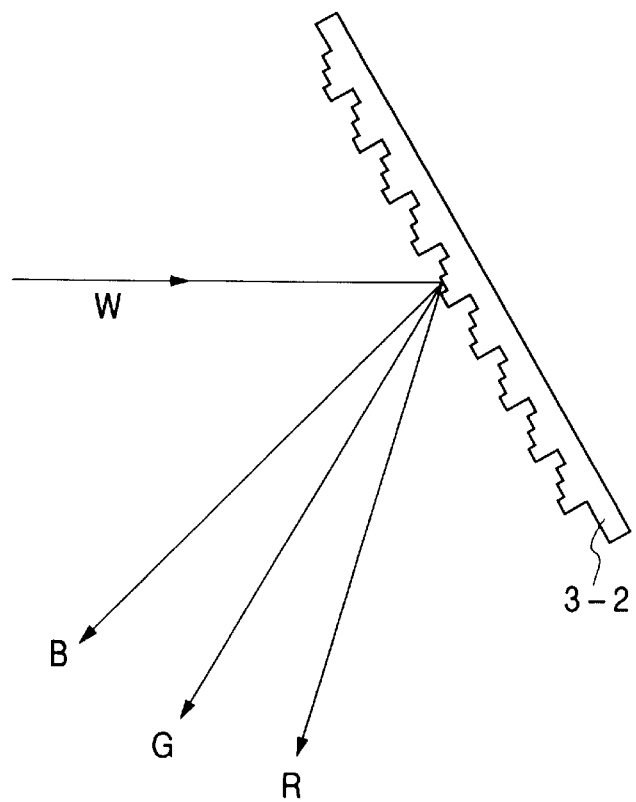
FIGS. 3 and 4 are schematic views showing another embodiments of the color separation means in FIG. 1.

In the present embodiment, the color separation element 3 may also be composed of a reflective diffraction grating 3-2 as shown in FIG. 3.

Referring to FIG. 3, the incident white light W is separatted, upon reflection, into 0th- and ±first-order diffracted lights showing the peaks of diffraction efficiency at the specific wavelength regions, owing to the difference in the optical path length created by the fine step-shaped reflective structures, whereby emitted are light beams of the wavelength regions of red, green and blue. In the reflective diffraction grating 3-2, the optical path is deflected upon reflection, but, in FIG. 1, such optical path is developed and represented in a transmissive optical system.

Figure 4:
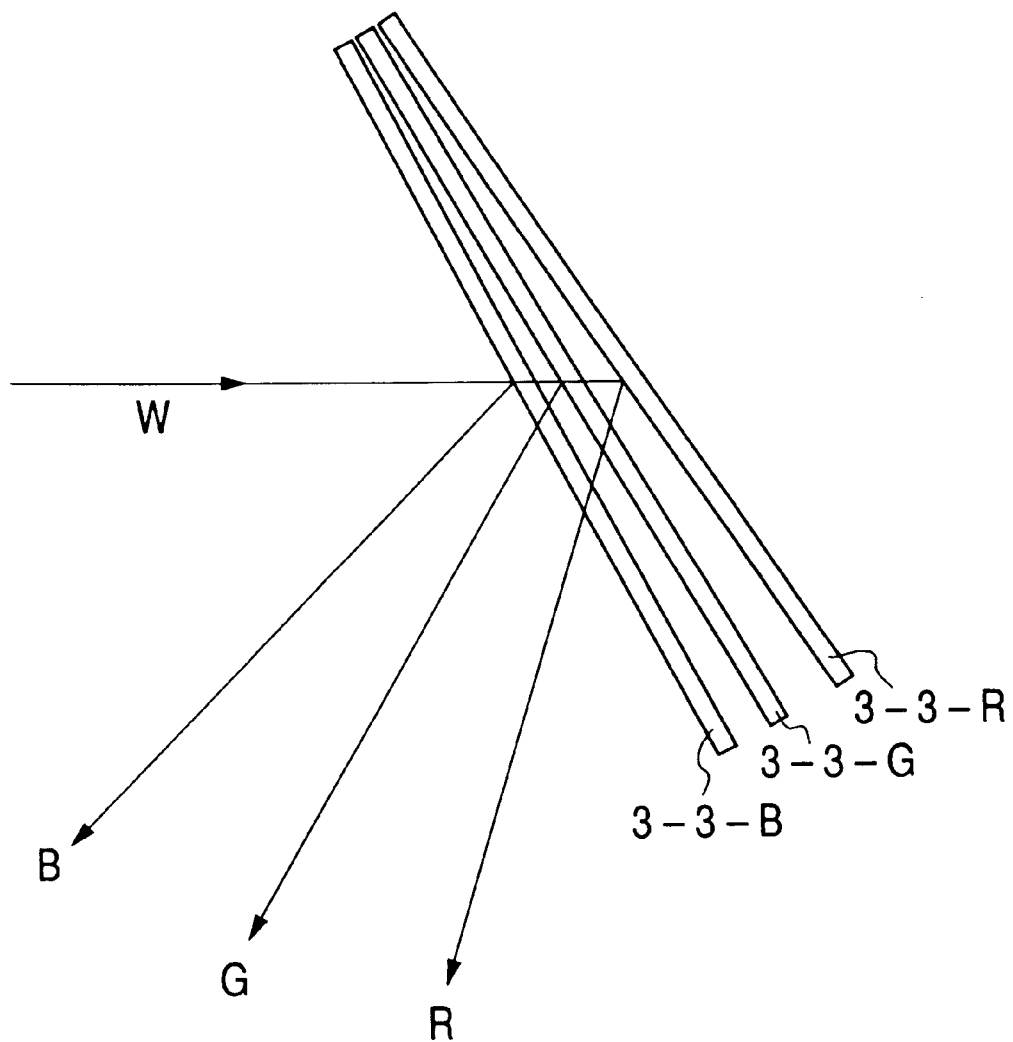

FIG. 4 is a schematic view of the color separation element of the present invention, in case it is composed of three dichroic mirrors 3-3-R, 3-3-G and 3-3-B. The dichroic mirror 3-3-B has such spectral characteristics as to reflect the B light of blue wavelength region but to transmit the G and R lights, while the dichroic mirror 3-3-G has such spectral characteristics as to reflect the G light of green wavelength region but to transmit the B and R lights, and the dichroic mirror 3-3-R has such spectral characteristics as to reflect the R light of red wavelength region but to transmit the light of orange wavelength region. The dichroic mirrors are provided in mutually inclined relationship, whereby the reflected light is separated into the R, G and B lights.

The dichroic mirror 3-3-R may also be replaced by a simple mirror of high reflectivity. The dichroic mirror deflects the optical path upon reflection, but in FIG. 1, such optical path is developed and represented as a transmissive optical system.

The color separation elements shown in FIGS. 2 to 4 are so constructed as to separate the R and B light beams at both sides of the G light beam at the center. Such configuration is, as will be explained later, to position the G light at the center of the diaphragm 28 of the projection optical system 22 and to position the R and B light beams at the peripheral portions of the diaphragm 28, thereby suppressing the influence of the aberrations of the projection optical system on the resolution of the image projected on the screen. The positioning of the G light beam at the center in the color separation optical system allows to simplify and compactize the entire configuration thereof, in case the color synthesizing optical system assumes a configuration with the G light beam at the center.

Both in the diffraction gratings 3-1, 3-2, shown in FIGS. 2 and 3 and in the dichroic mirrors shown in FIG. 4, the spectral characteristics of the color separation element show a significant dependence on the incident angle of the light beam, and such dependence on the incident angle induces unevenness of illumination in color and in luminance.

In the present embodiment, such unevenness in color or in luminance is prevented by placing the color separation element in the substantially parallel light beam, behind the reflector (parabolic mirror) 2.

Again referring to FIG. 1, the R, G and B lights from the color separation element 3 enter a condenser lens 4 at respectively different angles and so condensed by the condenser lens 4 as to form images of the light source in the vicinity of plural mirrors 5, 6 serving as first deflection means and provided in a mutually separated and mutually inclined manner.

Among the three color lights the G light beam passes between the mirrors 5 and 6, is then converted by a field lens 7 into a substantially parallel light beam and illuminates a transmissive liquid crystal panel 14. The light beam modulated according to the image information displayed on the transmissive liquid crystal panel 14 is condensed by a field lens 17 so as to again form an image of the light source between mirrors 20, 21 constituting second deflection means and positioned in the vicinity of the diaphragm 28 of a projection optical system (hereinafter also called projection lens) 22.

In the other hand, the R light beam is reflected by the mirror 5, then converted by a field lens 8 into a substantially parallel light beam, further guided by mirrors 10, 11 and illuminates a transmissive liquid crystal panel 15. The light beam modulated according to the image information displayed on the transmissive liquid crystal panel 15 is condensed by a field lens 18 so as to again form an image of the light source on the mirror 20 positioned in the vicinity of the diaphragm 28 of the projection optical system 22.

Similarly the B light beam is reflected by the mirror 6, then converted by a field lens 9 into a substantially parallel light beam, further guided by mirrors 12, 13 and illuminates a transmissive liquid crystal panel 16. The light beam modulated according to the image information displayed on the transmissive liquid crystal panel 16 is condensed by a field lens 19 so as to again form an image of the light source on the mirror 21 positioned in the vicinity of the diaphragm 28 of the projection optical system 22.

The mirrors 5, 6 constitute a part of the first deflection means (mirror means), and the mirrors 20, 21 constitute a part of the second deflection means.

The G light beam is guided to the projection optical system 22 by passing between the mirrors 20, 21 while the R and B light beams are also guided thereto by being reflected respectively by the mirrors 20, 21. Thus, the projection optical system 22 projects the image information of the liquid crystal panels 14, 15, 16 onto a screen 23, thus synthesizing such image information and forming a full-color image thereon.

The field lenses 18, 19 have a common optical axis 18a (19a), represented by a chain line, perpendicular to the optical axis of the field lens 17. The field lens 18 and the liquid crystal panel 15 are so positioned that the positions thereof, if turned over with respect to the mirror 20, coincide with those of the field lens 17 and the liquid crystal panel 14.

Similarly the field lens 19 and the liquid crystal panel 16 are so positioned that the positions thereof, if turned over with respect to the mirror 21, coincide with those of the field lens 17 and the liquid crystal panel 14. Stated differently, the liquid crystal panels 14, 15, 16 are in optically equivalent positions with respect to the projection optical system 22, and the light beams from the liquid crystal panels 14, 15, 16 pass through different portions within the diaphragm 28 of the projection optical system 22 and are synthesized into a full-color image on the screen 23.

In order to satisfy the above-mentioned relationship, the liquid crystal panels are positioned on the optical axes of the respectively corresponding field lenses, and the liquid crystal panels 15, 16 are illuminated with light beams inclined with respect to the optical axes 18a, 19a. The images of the light source, formed by the R, G and B light beams coming from the field lenses 17, 18, 19 have such sizes as to fill the diaphragm 28 of the projection optical system 22, in order to achieve effective utilization of the light beams.

Also the mirrors 20, 21 are so positioned as to divide the aperture of the diaphragm 28 of the projection optical system 22 into plural areas.

The above-mentioned second deflection means in the present embodiment includes two mirrors which are provided in a mutually spaced and mutually inclined manner, at a mutual angle of 90°.

The diffraction grating 3-1, shown in FIG. 2 and constituting the transmissive color separation element, received the incident light substantially perpendicularly. The diffraction angle $\theta_{\pm 1}$ of the ± first-order diffracted lights, with respect to the 0th-order diffracted light, is represented by:

$$\sin \theta_{\pm 1} = \lambda_{\pm 1}/p \tag{1}$$

wherein p is the pitch of the step-shaped diffraciton grating and $\lambda_{\pm 1}$ is the peak wavelength of the diffracted light.

As an example, in case of p=5 μm, the diffraction angles for the + first-order diffracted light constituting the R light beam and for the − first-order diffracted light constituting the B light beam are respectively 7.0° and 5.3°, thus being asymmetrical.

Similarly the diffraction grating 3-2, shown in FIG. 3 and constituting the reflective color separation element, receives the incident light at an incident angle i. The diffraction angle $\theta_{\pm 1}$ of the ± first-order diffracted lights, with respect to the 0th-order diffracted light, is represented by:

$$\sin (i+\theta_{\pm 1}) = \sin \cdot i + \lambda_{\pm 1}/p \tag{2}$$

wherein p is the pitch of the step-shaped diffraction grating and $\lambda_{\pm 1}$ is the peak wavelength of the diffracted light.

As an example, in case of i=30° and p=5 μm, the diffraction angles for the + first-order diffracted light constituting the R light beam (with a peak wavelength of 610 nm) and for the − first-order diffracted light constituting the B light beam (with a peak wavelength of 460 nm) are respectively 8.5° and 6.3°, thus being asymmetrical. The mirrors 5 and 6 are so inclined as to compensate such asymmetrical diffraction angles, so that the liquid crystal panels 15, 16 are illuminated at a same inclination angle. The compensation for the asymmetrical diffraction angles may also be achieved with other mirrors 10, 11, 12, 13.

In the present embodiment, the color separation optical system and the color synthesizing optical system are preferably so constructed that the green light beam passes through the central portion of the diaphragm 28 of the projection optical system while the blue and red light beams pass through the peripheral portions of the diaphragm 28.

Such configuration is based on a fact that the green light beam has the highest contribution to the resolution because of the largest amount of light coming from the light source and the relatively high visual sensitivity. On the other hand, the blue and red light beams, being lower in the relative visual sensitivity and thus having smaller contribution to the resolution, do not deteriorate the apparent resolution even if certain aberrations are generated in the projection optical system.

The mirrors employed in the present embodiment are preferably composed, for example, of aluminum mirrors of high reflectivity, but the mirrors 5, 10, 11, 20 are preferably provided with a reflection enhancing film for increasing the reflectance in the red wavelength region while the mirrors 6, 12, 13, 21 are preferably provided with a reflection enhancing film for increasing the reflectance in the blue wavelength region for improving the efficiency of utilization of the light from the light source, thereby obtaining a brighter image on the screen.

The diffraction gratings constituting the color separation elements shown in FIGS. 2 and 3 can be easily produced by the replica technology. Also the dichroic mirrors or the combination of the dichroic mirrors and the flat high reflectance mirror in FIG. 4 can also be produced relatively easily.

The mirrors 5, 6 for guiding the light beams from the color separation elements to the respective liquid crystal panels require a high reflectivity, but they can be of a small diameter enough for reflecting the images of the light source, as these mirrors are placed in the position where the images of the light source are formed by the condenser lens 4. Also the mirrors 20, 21 for synthesizing the light beams from the liquid crystal panels require a high reflectivity, but they can be of a small diameter enough for reflecting the images of the light source, as these mirrors are placed in the position where the images of the light source are formed by the field lenses 18, 19.

In the present embodiment, the first deflection means for guiding the light beams from the color separation element to the respective liquid crystal panels is composed of mirrors, but there may also be employed other light deflecting elements such as reflection prisms or refraction prisms. Such first deflection means, being provided in the vicinity of the position of the light source images formed by the condenser lens 4, can be of a small diameter enough for reflecting such images of the light source. Also the second deflection means 20, 21 for synthesizing the light beams from the liquid crystal panels may be replaced by reflection prisms or refraction prisms. Such second deflection means, being provided in the vicinity of the position of the light source images formed by the field lenses 18, 19 can be of a small diameter enough for reflecting such images of the light source.

As explained in the foregoing, the color separation optical system and the color synthesizing optical system of the present embodiment are principally composed of easily produceable high-reflectance mirrors, instead of the cross dichroic prisms which are difficult to produce and are expensive.

Also the present embodiment, being free from passing of the light beams through the inclined flat dichroic mirrors as in the conventional configuration, does not cause astigmatism, thereby providing an image with satisfactory resolution.

Figure 5:
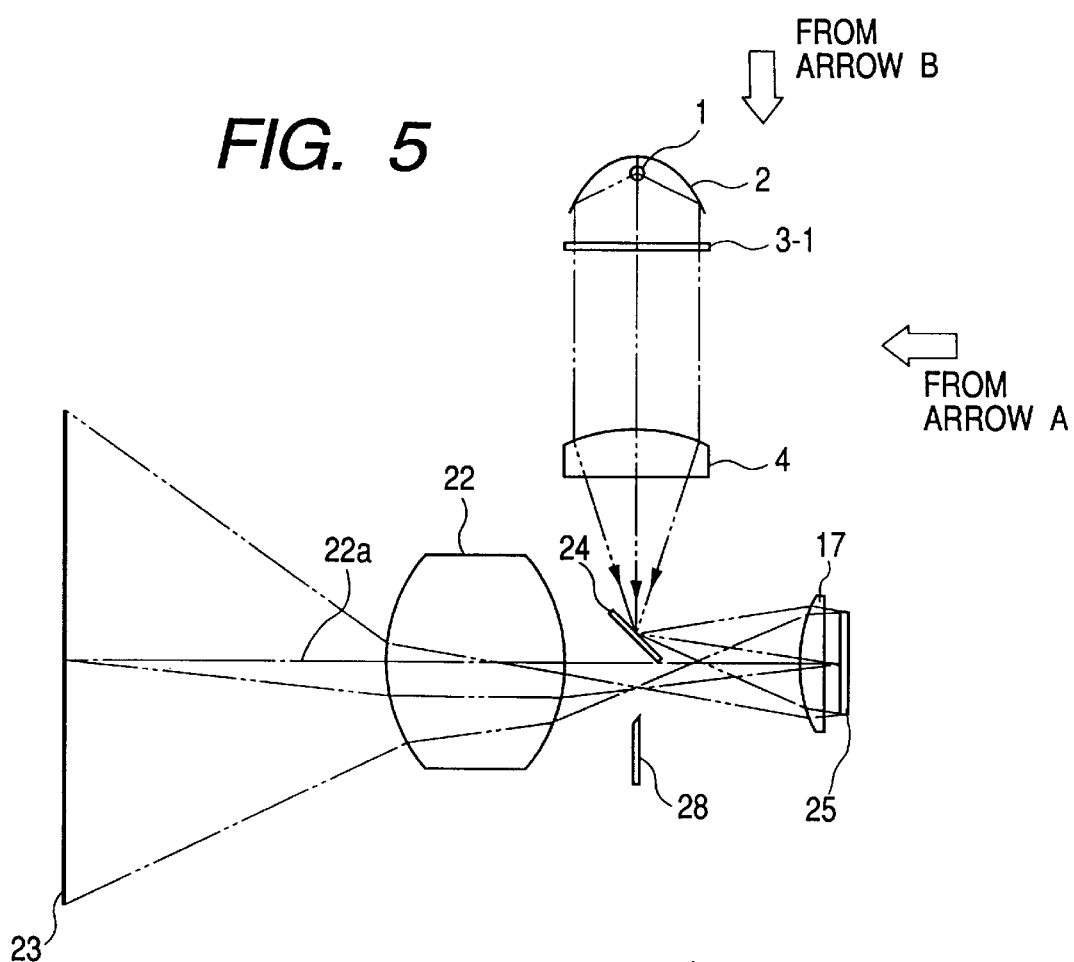
FIG. 5 is a schematic elevation view of an embodiment 2 of the present invention.
Figure 6:
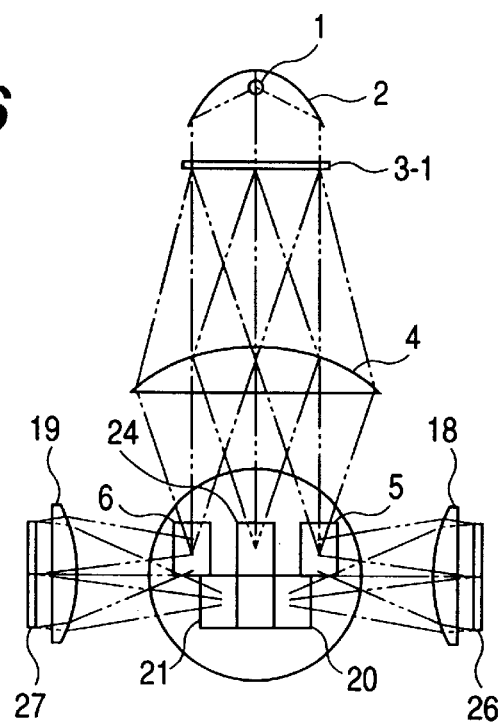
FIGS. 6 and 7 are views, respectively seen from directions A and B, of the embodiment 2 shown in FIG. 5.
Figure 7:
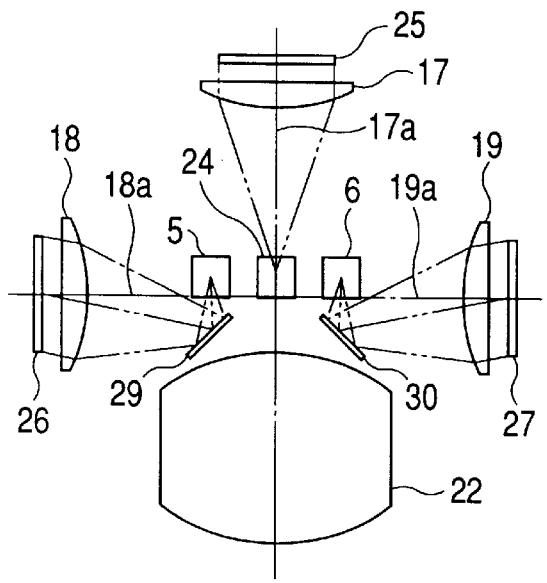

FIGS. 5 to 8 are schematic view of an embodiment 2 of the present invention, applied to a color liquid crystal projector employing reflective liquid crystal panels as the light modulation elements. FIG. 5 is an elevation view of the principal parts, while FIG. 6 is a view seen from a direction A shown in FIG. 5, and FIG. 7 is a view seen from a direction B in FIG. 5 and showing an optical system positioned above the optical axis 22a of a projection optical system 22 in FIG. 5.

Figure 8:
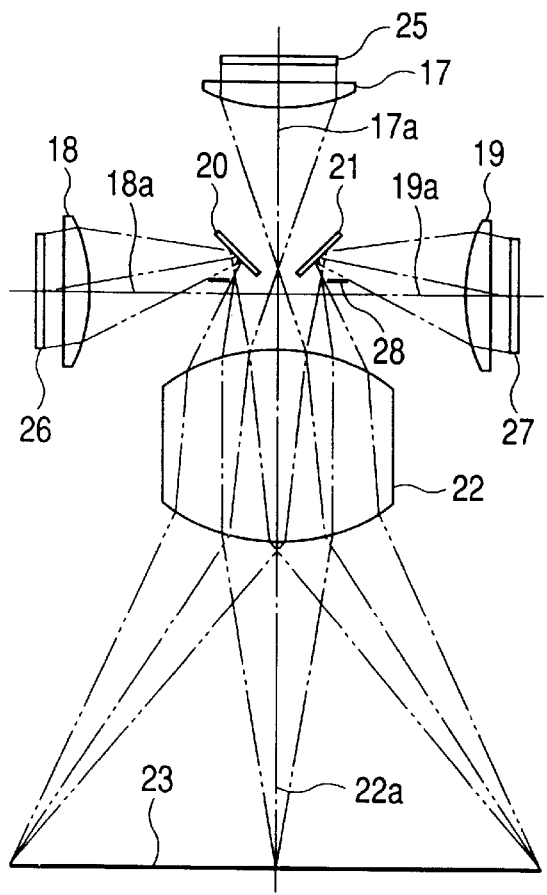
FIG. 8 is a partial view of the embodiment 2 shown in FIG. 5, seen from the direction B.
Figure 9:
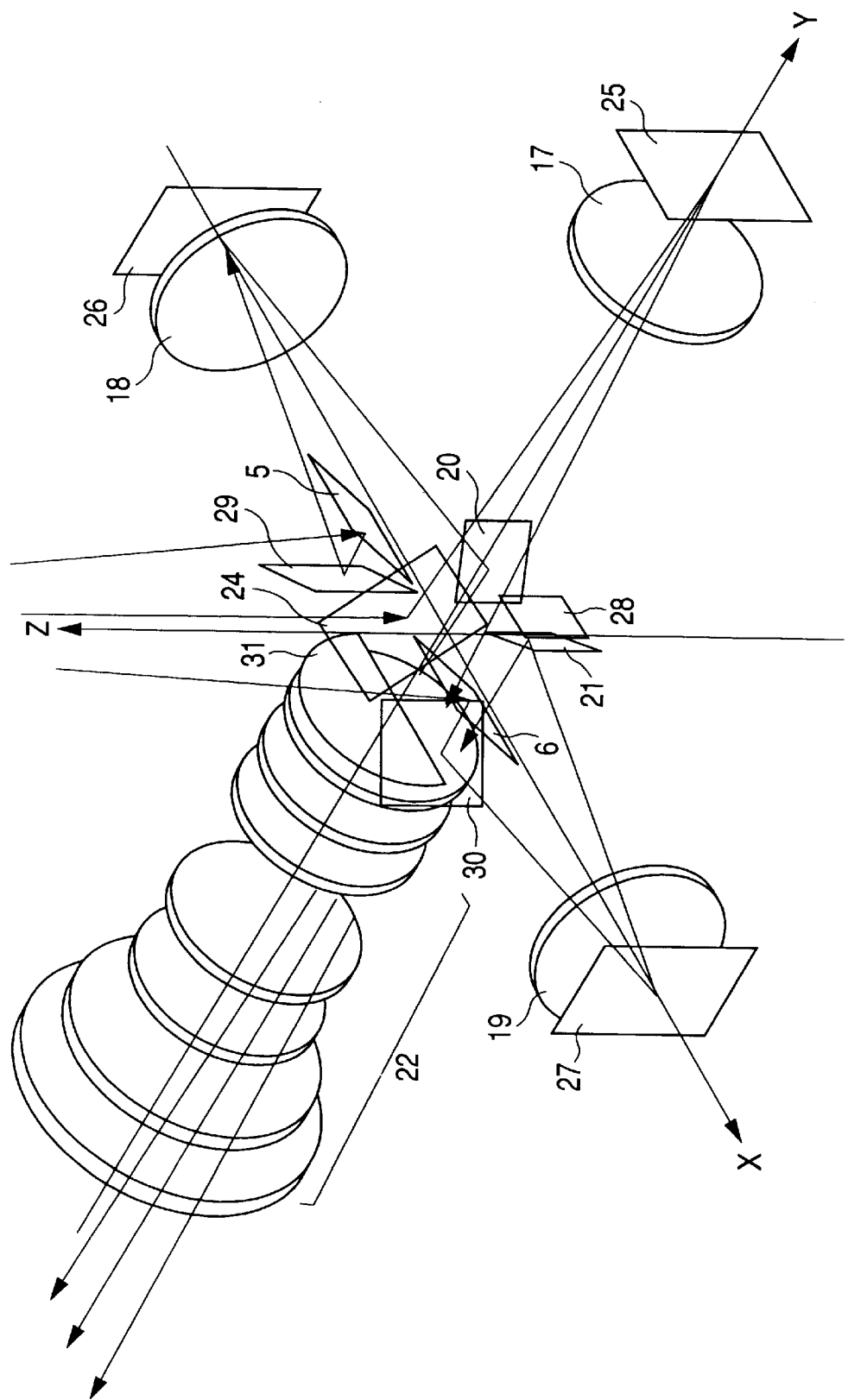
FIG. 9 is a partial perspective view of the embodiment 2 of the present invention.

Similarly FIG. 8 is a view seen from a direction B in FIG. 5 and showing an optical system positioned below the optical axis 22a of the projection optical system 22 in FIG. 5. FIG. 9 is perspective view showing the arrangement of mirrors in the color separation optical system and the color synthesizing optical system in the embodiment 2.

Referring to FIG. 5, the white light W emitted from a light source (light source means) 1 is reflected and converted by a reflector (parabolic mirror) 2 into a substantially parallel light beam, which is then separated, by a transmissive diffraction grating (color separation means) 3-1 shown in FIG. 2, into light beams corresponding to red, green and blue wavelength regions. The transmissive diffraction grating 3-1 is positioned in the substantially parallel light beam emerging from the reflector 2, in order to avoid unevenness of the illumination in color and in luminance.

The color lights (R, G, B light beams) from the diffraction grating 3-1 enter a condenser lens (lens means) 4 at mutually different angles in a direction perpendicular to the plane of FIG. 5, and are so condensed by the condenser lens as to form images of the light source in the vicinity of mirrors 24, 5, 6 provided in a mutually separated and mutually inclined manner in the vicinity of the diaphragm 28 of a projection optical system 22. The G light beam, lying in the plane of FIG. 5, is reflected by the mirror 24, and converted by a field lens 17 into a substantially parallel light beam, which illuminates a reflective liquid crystal panel 25 obliquely from above. The light beam modulated by the image information displayed on the liquid crystal panel 25 is reflected thereby obliquely downwards, and is condensed by the field lens 17 so as to form an image of the light source again in a position between mirrors 20, 21 provided in the vicinity of the diaphragm 28 of the projection optical system 22.

Now there will be given an explanation on the R and B light beams, with reference to FIGS. 6, 7 and 8. The R light beam is reflected in succession by mirrors 5, 29, and converted by the field lens 18 into a substantially parallel light beam which illuminates a reflective liquid crystal panel 26. The direction of illumination for the liquid crystal panel is, in the plane of FIG. 6, obliquely from above as in the case of the G light beam, but, in the plane of FIG. 7, obliquely from below. The light beam modulated by the image information displayed on the liquid crystal panel 26 is reflected thereby in a direction opposite to the direction of the incident light, and is condensed by the field lens 18 so as to form an image of the light source again on the mirror 20 provided in the vicinity of the diaphragm 28 of the projection optical system 22.

Similarly the B light beam is reflected in succession by mirrors 6, 30, and converted by the field lens 19 into a substantially parallel light beam which illuminates a reflective liquid crystal panel 27. The direction of illumination for the liquid crystal panel is, in the plane of FIG. 6, obliquely from above as in the case of the G light beam, but, in the plane of FIG. 7, obliquely from below. The light beam modulated by the image information displayed on the liquid crystal panel 27 is reflected thereby in a direction opposite to the direction of the incident light, and is condensed by the field lens 19 so as to form an image of the light source again on the mirror 21 provided in the vicinity of the diaphragm 28 of the projection optical system 22.

The G light beam passes through the gap between the mirrors 20, 21 while the R and B light beams are respectively reflected by the mirrors 20, 21, thus all entering the projection optical system 22, which thus projects the image information of the liquid crystal panels 25, 26, 27 on a screen 23 and synthesizing a full-color image thereon. The field lenses 18, 19 have a common optical axis 18a (19a), represented by a chain line, perpendicular to the optical axis 17a of the field lens 17. The field lens 18 and the liquid crystal panel 26 are so positioned that the positions thereof, when turned over with respect to the mirror 20, respectively coincide with those of the field lens 17 and the liquid crystal panel 25.

Similarly the field lens 19 and the liquid crystal panel 27 are so positioned that the positions thereof, when turned over with respect to the mirror 21, respectively coincide with those of the field lens 17 and the liquid crystal panel 25. Stated differently, the liquid crystal panels are provided in optically equivalent positions with respect to the projection optical system 22, and the light beams from the respective liquid crystal panels 25, 26, 27 pass through different portions of the diaphragm 28 of the projection optical system 22 and synthesize the full-color image on the screen 23. In order to satisfy such relationship, the liquid crystal panels are provided on the optical axes of the corresponding field lenses, and the liquid crystal panels 26 and 27 are illuminated with the light beams which are inclined with respect to the optical axes, in the planes of FIGS. 7 and 8. The images of the light source, formed by the R, G, and B light beams coming from the field lenses 17, 18, 19 have such sizes as to fill the diaphragm 28 of the projection optical system 22, thereby achieving efficient utilization of the light beams.

The mirrors 5, 6, 24, 29, 30 constitute a part of the mirror means, while the mirrors 20, 21 constitute a part of the second deflection means.

The diffraction grating 3-1, constituting the transmissive color separation element, receives the incident light substantially perpendicularly, so that the diffraction angle $\theta_{\pm1}$ of the ± first-order diffracted lights, with respect to the 0th-order diffracted light, is given by the equation (1). As the + first-order diffracted light the − first-order diffracted light are asymmetrical, the mirrors 29, 30 may be so inclined that the liquid crystal panels 26, 27 are illuminated at a same inclination angle.

FIG. 9 is a perspective showing the arrangement of the mirrors 24, 5, 6, 29, 30 in the color separating-illuminating optical system and the mirrors 20, 21 in the color synthesizing optical system. This view facilitates the understanding of the positional relationship of these mirrors. In FIG. 9, the optical components from the light source 1 to the condenser lens 4 are omitted. A light shield plate 31, provided on the upper half of the rearmost lens of the projection optical system 22, is to avoid direct entry of the stray light, from the color separating-illuminating optical system, into the projection optical system 22, and serves to provide a projection image of a high contrast, without the stray light.

The mirror means (5, 6, 24, 29, 30) and the second deflection means (20, 21) are respectively provided in two areas including the optical axis 22a, divided in the aperture of the diaphragm 28 of the projection optical system 22. In addition to the diaphragm 28, there may also be provided a diaphragm for compensating the unevenness in the intensities of the B and R light beams, in a position between the mirrors 20, 21 and the projection optical system 22.

Also in the present embodiment, as in the foregoing first embodiment, the color separation optical system and the color synthesizing optical system are preferably so constructed that the green light beam passes through the central portion of the diaphragm 28 of the projection optical system 22 while the blue and red light beams pass through the peripheral portions of the diaphragm 28.

The mirrors employed in the present embodiment are preferably composed, for example, of aluminum mirrors of high reflectivity, but the mirrors 5, 29, 20 are preferably provided with a reflection enhancing film for increasing the reflectance in the red wavelength region while the mirrors 6, 30, 21 are preferably provided with a reflection enhancing film for increasing the reflectance in the blue wavelength region for improving the efficiency of utilization of the light from the light source, thereby obtaining a brighter image on the screen.

The diffraction gratings 3-1 constituting the color separation elements of the present embodiment can be easily produced by the replica technology. Also the mirrors 24, 5, 6 for guiding the light beams from the diffraction gratings, constituting the color separation elements, to the respective liquid crystal panels are mirrors of high reflectivity.

These mirrors can be of a small diameter enough for reflecting the images of the light source, as they are provided in the position of the light source images formed by the condenser lens 4. Similarly the mirrors 29, 30 for guiding the light beams from the mirrors 5, 6 to the liquid crystal panels can be composed of mirrors of high reflectivity.

Also the mirrors 20, 21 for synthesizing the light beams from the liquid crystal panels are composed of mirrors of high reflectivity, but they can be of a small diameter enough for reflecting the images of the light source, as these mirrors are placed in the position where the images of the light source are formed by the field lenses 18, 19. The mirrors 20, 21 are rendered movable in a direction parallel to the respective reflecting plane, in order to adjust the color balance.

The liquid crystal panel adapted for use in the present embodiment can be, for example, a polymer dispersion liquid crystal panel, which becomes transparent to reflect the light beam in case of displaying the white level but scatters the light beam in case of displaying the black level. The light beams reflected by the liquid crystal panels are respectively condensed, by the field lenses 17, 18, 19, in the vicinity of the diaphragm aperture 28 of the projection optical system 22. A major portion of the light beam reflected by the liquid crystal panel passes through the diaphragm aperture 28, thereby displaying the white level on the screen 23 through the projection optical system 22.

In the other hand, within the light beam scattered by the liquid crystal panel, only a very small portion passes through the diaphragm aperture 28, thereby displaying the black level on the screen 23. If the field lens has a convex face at the side of the projection optical system 22, the reflected light beam reaches less the screen 23 from the apex of such lens, whereby the projected image provides a higher contrast. More specifically, by the use of a plano-convex lens having a non-convex face at the side of the liquid crystal panel, the light reflected from the lens face at the side of the liquid crystal panel is not condensed on the screen, whereby the projected image provides a higher contrast.

As explained in the foregoing, the color separation optical system and the color synthesizing optical system of the present embodiment can be principally composed of high-reflectance mirrors, instead of the cross dichroic prisms which are difficult to produce, even in case of combination with the reflective liquid crystal panels. Also the present embodiment, being free from passing of the light beams through the inclined flat dichroic mirrors as in the conventional configuration, does not cause astigmatism, thereby providing an image with satisfactory resolution.

Figure 10:
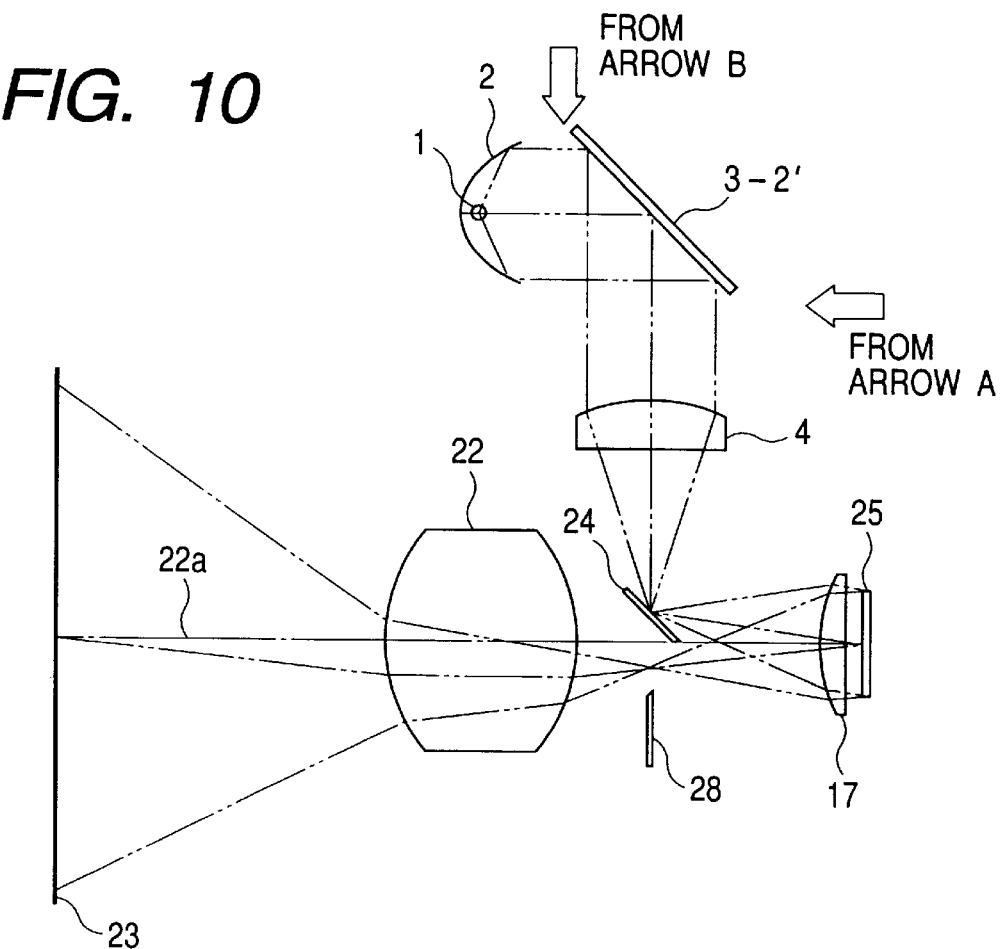
FIG. 10 is a schematic elevation view of an embodiment 3 of the present invention.
Figure 11:
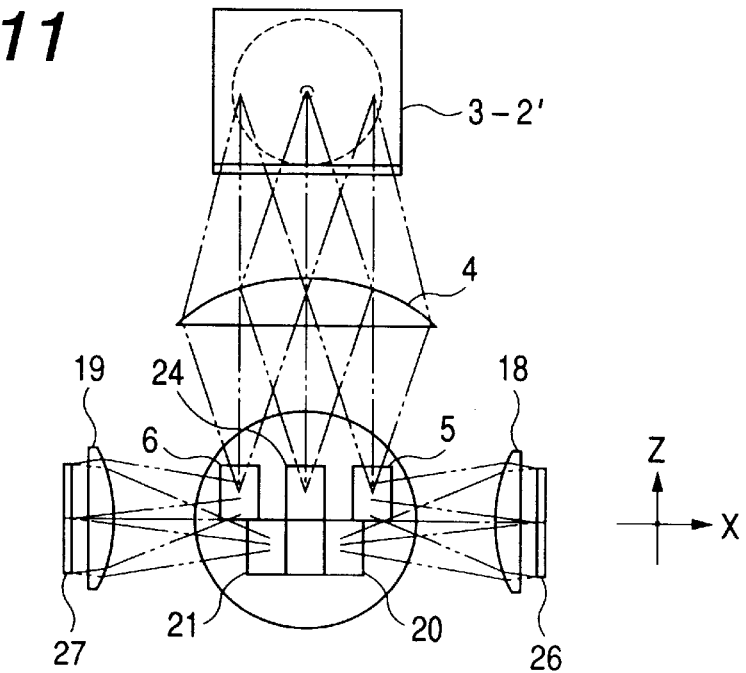
FIG. 11 is a view, seen from a direction A, of the embodiment 3 shown in FIG. 10.

FIGS. 10 and 11 are schematic views of an embodiment 3 of the present invention, which is same in the basic configuration as the embodiment 2 but is different therefrom in that the transmissive diffraction grating is replaced by a reflective diffraction grating 3-2' as the color separation element. FIG. 10 is a schematic elevation view, while FIG. 11 is a view seen from a direction A shown in FIG. 10. A view seen from a direction B is omitted since it is similar to FIG. 7. Also a view showing the optical system provided below the optical axis 22a of the projection optical system 22 in FIG. 10 is omitted since it is similar to FIG. 8.

In FIG. 10, optical components equivalent to those in FIG. 5 are represented by same numbers as in FIG. 5. The configuration shown in FIG. 10 is same as that shown in FIG. 5, except that the transmissive diffraction grating 3-1 is replaced by a reflective diffraction grating 3-2' as shown in FIG. 3.

The white light emitted from a light source 1 is reflected and converted by a reflector (parabolic mirror) 2 into a substantially parallel light beam, which is then separated, by a reflective diffraction grating 3-2', into light beams corresponding to red, green and blue wavelength regions.

The reflective diffraction grating 3-2' is also so constructed as to separate the R and B light beam on both sides of the G light beam at the center. As will be explained later, such configuration is to position the G light beam at the central portion of the diaphragm 28 of the projection optical system 22 while positioning the R and B light beam in the peripheral portions of the diaphragm 28, thereby reducing the influence of the aberrations of the projection optical system on the resolution of the image projected on the screen. Such configuration of the color separating optical system, having the G light beam at the center, allows to simplify and compactize the entire optical system for color separation and color synthesis in case the color synthesizing optical system assumes a configuration with the G light beam at the center.

The reflective diffraction grating 3-2' is positioned in the substantially parallel light beam emerging from the reflector, in order to avoid unevenness of the illumination in color and in luminance.

Figure 12:
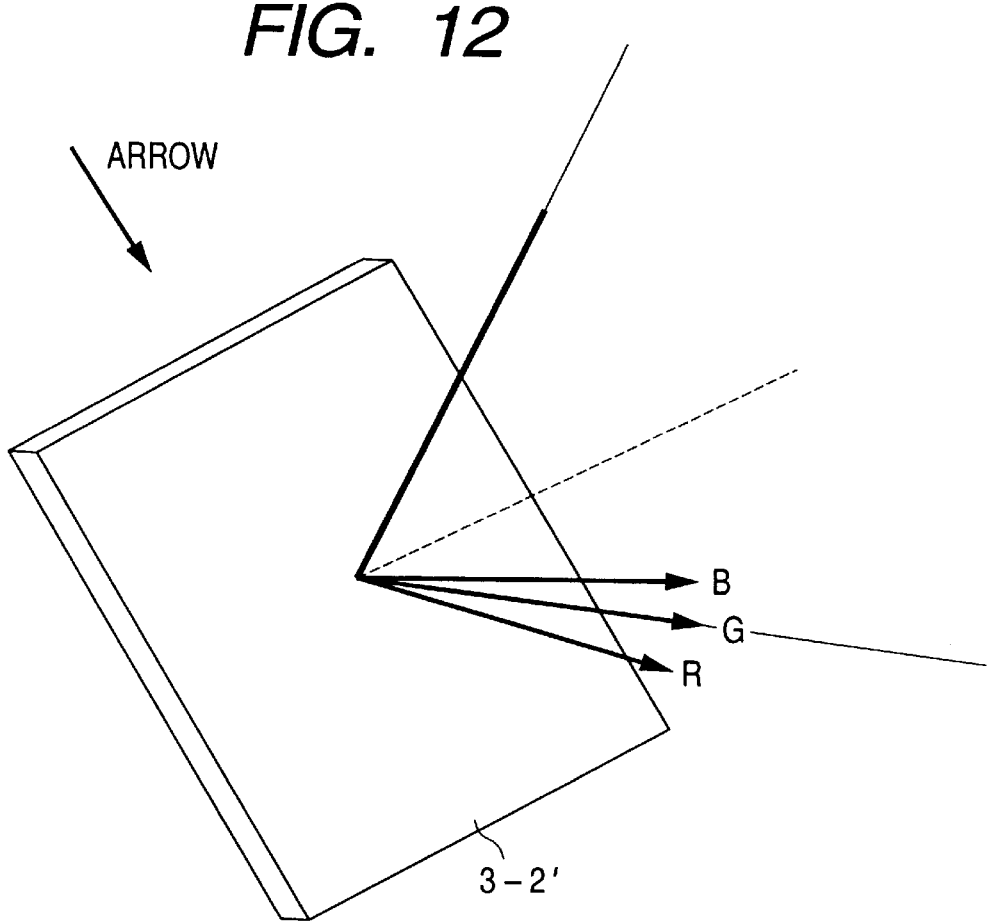
FIGS. 12 and 13 are schematic views of the color separation means shown in FIG. 10.
Figure 13:
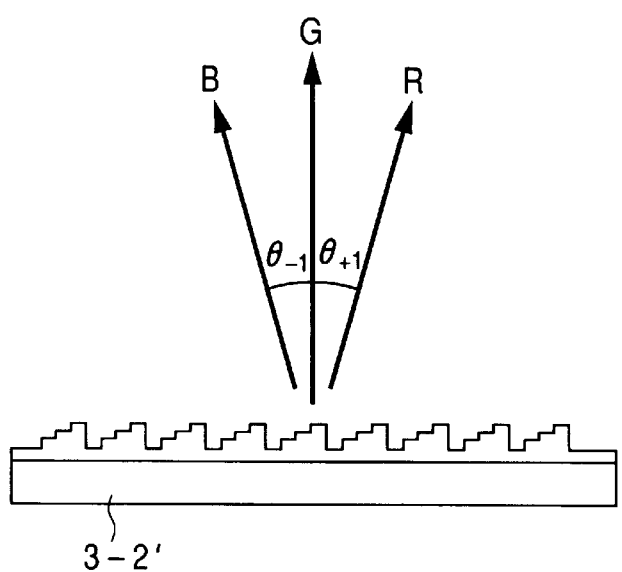

Now there will be explained the configuration of the reflective diffraction grating 3-2' of the present embodiment, with reference to FIG. 12 and FIG. 13 which is a cross-sectional view of the reflective diffraction grating 3-2' seen from a direction of the arrow in FIG. 12. Referring to FIG. 12, the direction of the stripes of the grating is parallel to a plane defined by the incident plane and the reflecting plane of the 0th-order diffracted light. The direction of the fine stepwise structure of the grating is, as shown in FIG. 13, perpendicular to the plane defined by the incident plane and the reflecting plane of the 0th-order diffracted light, and the ± first-order diffracted lights are generated in such perpendicular direction. Such mode of use of the diffraction grating is called conical diffraction.

In order to facilitate the construction of the color separation optical system with mirrors featuring the present embodiment, the separation angle of the ± first-order diffracted lights has to be as large as about 5° to 10°. If the ± first-order diffracted lights are generated in the plane defined by the incident plane and the reflecting plane of the 0th-order diffracted light (cf. FIG. 2), there will be generated an eclipse of the light beam by the vertical face of the stepwise grating, leading to the deterioration of the diffraction efficiency. In the present embodiment, this drawback is alleviated by using the reflective diffraction grating 3-2' under the condition of conical diffraction.

Also in combining the reflective liquid crystal panels with the reflective diffraction grating, the use of such reflective diffraction grating under the condition of conical diffraction as in the present embodiment allows to position the light source unit 1, the reflector 2 and the projection optical system 22, which occupy a large area in the optical system, in a same plane as shown in FIG. 10, thereby compactizing the projector apparatus.

Again referring to FIG. 10, the R, G and B lights from the diffraction grating 3-2' enter the condenser lens 4 at respectively different angles in a plane perpendicular to the plane of the drawing, and are so condensed by the condenser lens 4 as to form images of the light source in the vicinity of mirrors 24, 5, 6 which are provided in a mutually spaced and mutually inclined manner in the vicinity of the diaphragm 28 of the projection optical system 22. The G light beam, lying in the plane of FIG. 10, is reflected by the mirror 24, and converted by the field lens 17 into a substantially parallel light beam, which illuminates the reflective liquid crystal panel 25 obliquely from above. The light beam modulated by the image information displayed on the liquid crystal panel 25 is reflected thereby obliquely downwards, and is condensed by the field lens 17 so as to form an image of the light source again in a position between mirrors 20, 21 provided in the vicinity of the diaphragm 28 of the projection optical system 22.

Now there will be given an explanation on the R and B light beams, with reference to FIG. 11. The R light beam is reflected in succession by the mirrors 5, 29, and converted by the field lens 18 into a substantially parallel light beam which illuminates the reflective liquid crystal panel 26. The light beam modulated by the image information displayed on the liquid crystal panel 26 is reflected thereby in a direction opposite to the direction of the incident light, and is condensed by the field lens 18 so as to form an image of the light source again on the mirror 20 provided in the vicinity of the diaphragm 28 of the projection optical system 22.

Similarly the B light beam is reflected in succession by the mirrors 6, 30, and converted by the field lens 19 into a substantially parallel light beam which illuminates the reflective liquid crystal panel 27. The light beam modulated by the image information displayed on the liquid crystal panel 27 is reflected thereby in a direction opposite to the direction of the incident light, and is condensed by the field lens 19 so as to form an image of the light source again on the mirror 21 provided in the vicinity of the diaphragm 28 of the projection optical system 22.

The G light beam passes through the gap between the mirrors 20, 21 while the R and B light beams are respectively reflected by the mirrors 20, 21, thus all entering the projection optical system 22, which thus projects the image information of the liquid crystal panels 25, 26, 27 on the screen 23 and synthesizing a full-color image thereon.

The positional relationship among the field lenses 17, 18, 19, the reflective liquid crystal panels 25, 26, 27 and the mirrors 20, 21 is similar to that in the embodiment 2. More specifically, the liquid crystal panels are provided in the optically equivalent positions with respect to the projection optical system 22, and the light beams from the respective liquid crystal panels pass through respectively different portions of the diaphragm 28 of the projection optical system 22, and synthesizes a full-color image on the screen 23.

The images of the light source, formed by the R, G and B light beams coming from the field lenses 17, 18, 19 have such sizes as to fill the diaphragm 28 of the projection optical system 22, thereby achieving efficient utilization of the light beams. The color separation optical system and the color synthesizing optical system are so constructed as to position the green light beam at the central portion of the diaphragm 28 of the projection optical system 22 while positioning the blue and red light beams in the peripheral portions of the diaphragm, thereby obtaining a projected image of a high resolution.

The reflective diffraction grating 3-2' receives the incident light at an incident angle i. Under the condition of conical diffraction, the ± first-order diffracted lights are generated in directions substantially perpendicular to the plane containing the incident angle i. The diffraction angle $\theta_{\pm 1}$ of the ± first-order diffracted lights with respect to the 0th-order diffracted light, is approximately represented by the following equation, for a small diffraction angle:

$$\sin \theta_{\pm 1} = \lambda_{\pm 1}/p \quad (1')$$

wherein p is the pitch of the step-shaped diffraction grating and $\lambda_{\pm 1}$ is the peak wavelength of the diffracted light.

As the ±first-order diffracted light constituting the R light beam and the −first-order diffracted light constituting the B light beam are asymmetrical, the inclinations of the mirrors 29, 30 may be so adjusted that the liquid crystal panels 26, 27 are illuminated at a same inclination angle. In the conical diffraction, the diffracted light beam is generated in conical shape as the name indicates, the ±first-order diffracted lights show a mutual deviation in a direction parallel to a plane containing the incident angle i. The inclinations of the mirrors 5, 6 may be so adjusted that the liquid crystal panels 26, 27 are illuminated at an inclination angle same as that for the liquid crystal panel 25.

The mirrors in the present embodiment are composed aluminum mirrors of high reflectivity, optimized to the wavelength regions as in the embodiment 2, thereby improving the efficiency of utilization of the light and thus providing a bright image on the screen.

The diffraction grating 3-2' employed in the present embodiment can be easily produced in a large amount by the replica technology. The high-reflectivity mirrors 24, 5, 6 for guiding the light beams from the diffraction grating to the respective liquid crystal panels can be mirrors of a small diameter, and those 20, 21 for synthesizing the light beams from the liquid crystal panels can also be mirrors of a small diameter.

The liquid crystal panels suitable for the present embodiment can be, for example, polymer dispersion liquid crystal panels as in the embodiment 2.

As explained in the foregoing, the color separation optical system and the color synthesizing optical system of the present embodiment can be principally composed of mirrors of high reflectivity, even in the combination with the reflective liquid crystal panels, instead of the cross dichroic prisms which are difficult to produce. Also the present embodiment, being free from passing of the light beams through the inclined flat dichroic mirrors as in the conventional configuration, does not cause astigmatism, thereby providing an image with satisfactory resolution.

Figure 14:
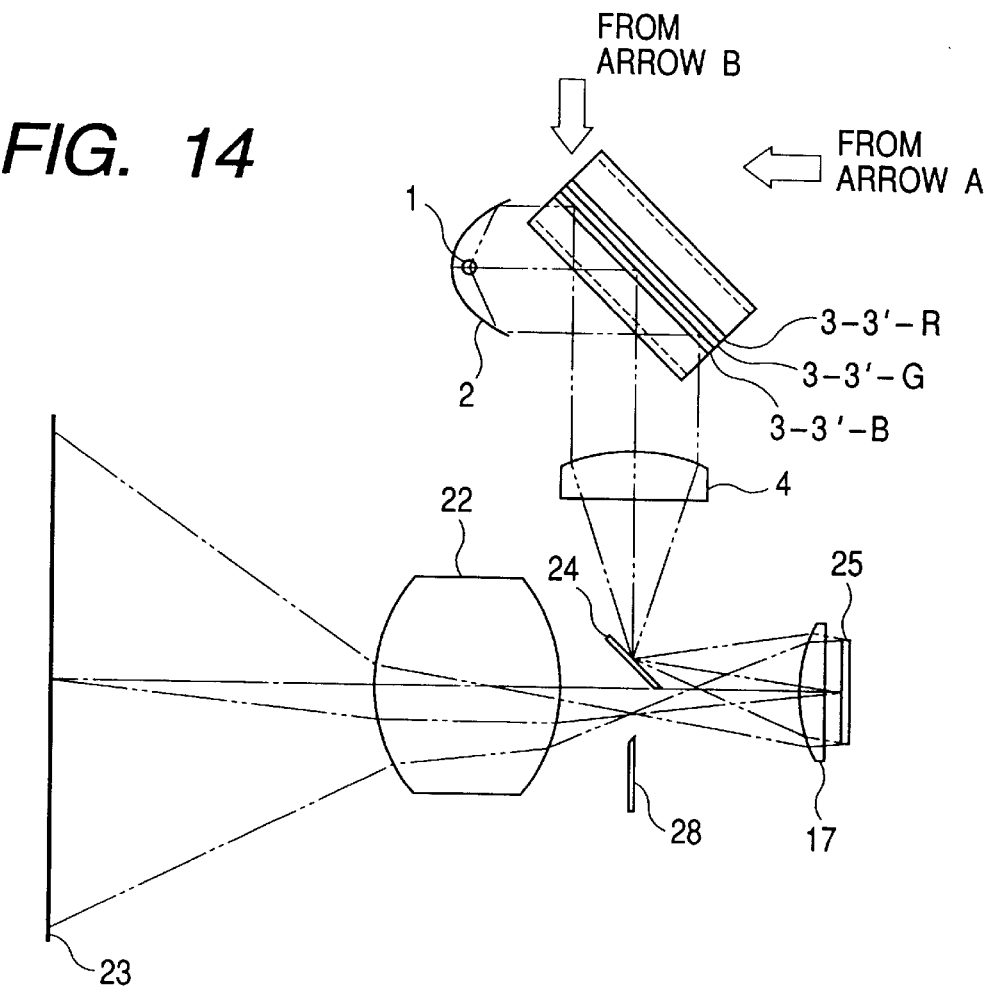
FIG. 14 is a schematic elevation view of an embodiment 4 of the present invention.
Figure 15:
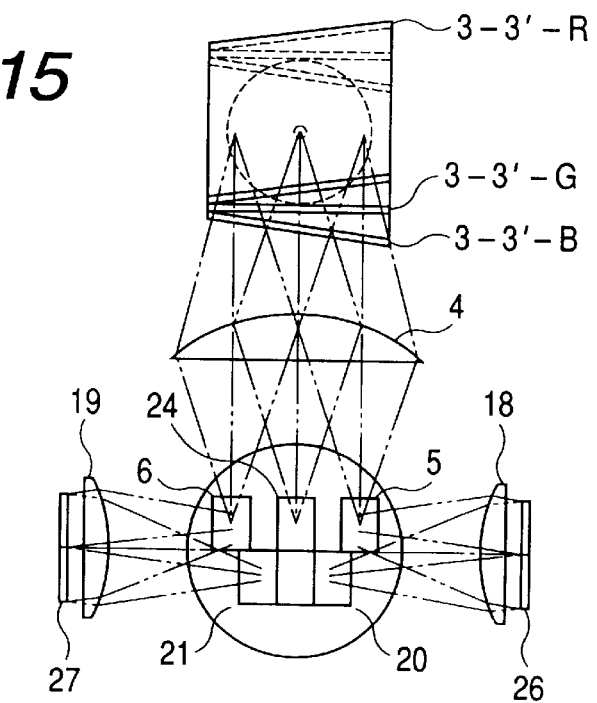
FIG. 15 is a view, seen from a direction A, of the embodiment 4 shwon in FIG. 14.

FIGS. 14 and 15 are partial schematic views of an embodiment 4 of the present invention. The present embodiment is same in configuration as the foregoing embodiment 1, except that the color separation element is composed of plural dichroic mirrors.

FIG. 14 is a schematic elevation view, while FIG. 15 is a view seen from a direction A in FIG. 14. A view seen from a direction B is omitted since it is similar to FIG. 7. Also a view showing the optical system provided below the optical axis 22a of the projection optical system 22 in FIG. 14 is omitted since it is similar to FIG. 8.

In FIG. 14, optical components equivalent to those in FIG. 5 are represented by corresponding numbers. In the configuration shown in FIG. 14, the transmissive diffraction grating shown in FIG. 5 is replaced by three dichroic mirrors 3-3'-R, 3-3'-G. 3-3'-B, similar to those shown in FIG. 4, but other parts remain unchanged.

The white light emitted from a light source 1 is reflected and converted by a reflector (parabolic mirror) 2 into a substantially parallel light beam, which is then separated, by three dichroic mirrors, into light beams corresponding to red, green and blue wavelength regions.

The dichroic mirrors 3-3'-R, 3-3'-G, 3-3'-B are also so constructed as to separate the R and B light beams on both sides of the G light beam at the center. As will be explained later, such configuration is to position the G light beam at the central portion of the diaphragm 28 of the projection optical system 22 while positioning the R and B light beams in the peripheral portions of the diaphragm 28, thereby reducing the influence of the aberrations of the projection optical system on the resolution of the image projected on the screen. Such configuration of the color separating optical system, having the G light beam at the center, allows to simplify and compactize the entire optical system for color separation and color synthesis in case the color synthesizing optical system assumes a configuration with the G light beam at the center.

The dichroic mirrors 3-3'-R, 3-3'-G, 3-3'-B are positioned in the substantially parallel light beam emerging from the reflector, in order to avoid unevenness of the illumination in color and in luminance.

Now there will be explained the configuration of the three dichroic mirrors of the present embodiment, with reference to FIG. 16 and FIG. 17 which is a cross-sectional view of the three dichroic mirrors seen from the direction of an arrow. The dichroic mirror 3-3'-B has such spectral characteristics as to reflect the blue light beam and to transmit the green and red light beams, while the dichroic mirror 3-3'-G has such spectral characteristics as to reflect the green light beam and to transmit the blue and red light beams, and the dichroic mirror 3-3'-R has such spectral characteristics as to reflect the red light beam and to transmit the orange wavelength region. As these mirrors are positioned in mutually inclined manner, the reflected lights are separated into those of R, G, B wavelength regions. The dichroic mirror 3-3'-R may also be replaced by an ordinary mirror of high reflectivity.

Figure 16:
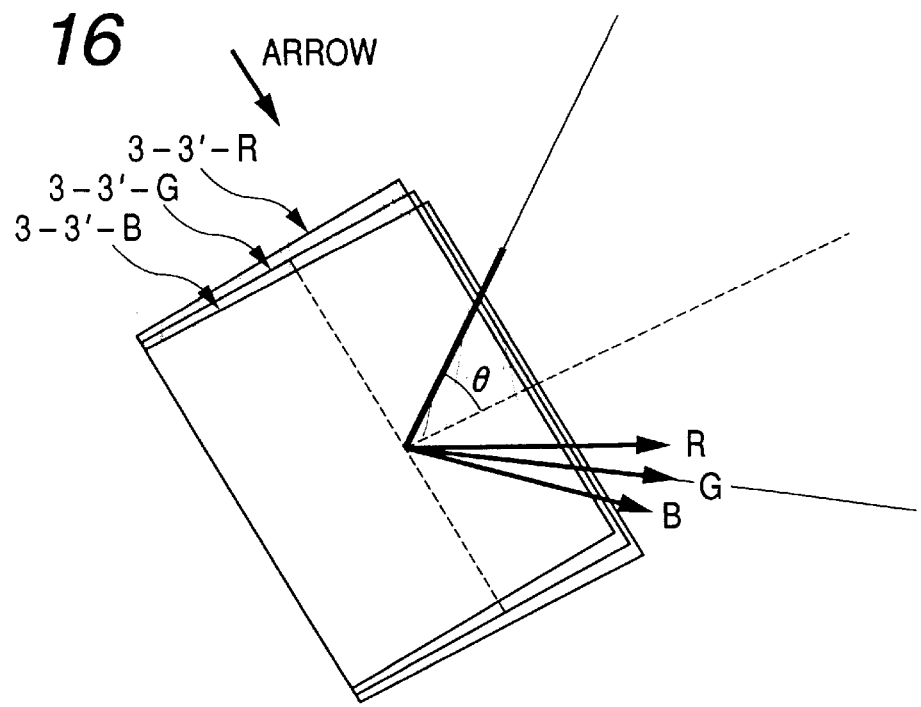
FIGS. 16, 17 and 18 are schematic views of the color separation means shown in FIG. 10.
Figure 17:
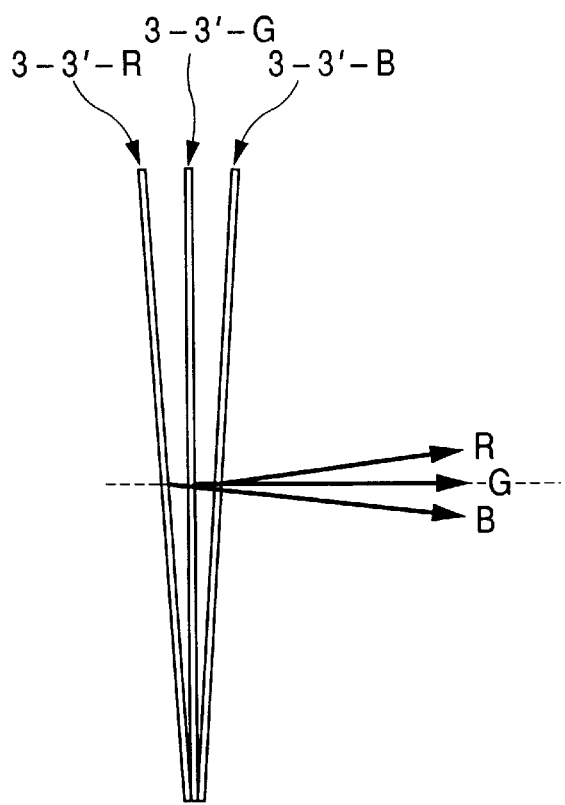

As shown in FIGS. 16 and 17, the light beams of respective colors are separated in a direction perpendicular to a plane defined by the incident plane and the reflecting plane of the G light beam. In combining the reflective liquid crystal panels with the three dichroic mirrors, the arrangement thereof of the present embodiment allows to position the light source unit 1, the reflector 2 and the projection optical system 22, which occupy a large area in the optical system, in a same plane as shown in FIG. 14, thereby compactizing the projector apparatus. On the other hand, such advantage is difficult to achieve if the separating direction of the light beams of respective colors is selected same as the deflecting direction of the light beam by reflection.

Figure 18:
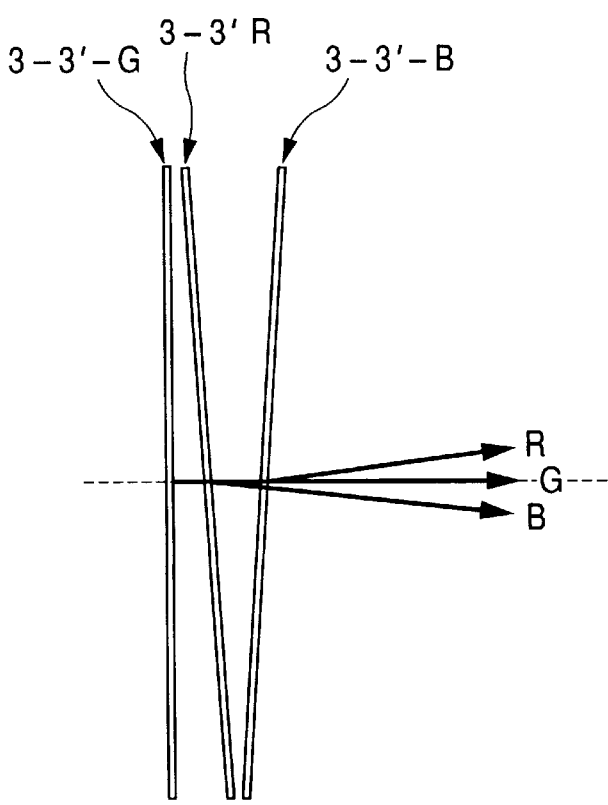

The three dichroic mirrors may also be arranged as shown in FIG. 18. In such arrangement, the dichroic mirror 3-3'-G may have wedge filter characteristics for reflecting the light of green wavelength region and transmitting the light of orange or red wavelength region. Also in such arrangement, the band-pass filter characteristics for reflecting the green light beam and transmitting the blue and red light beams are no longer required, and the preparation of the filter can be facilitated because of the reduced number of deposited layers required.

Also in the arrangement shown in FIG. 17 in which the light beam from the dichroic mirror 3-3'-R passes the dichroic mirror 3-3'-G twice, the attenuation of light is not negligible as the transmittance of the band pass filter is about 90% at maximum.

In general, the metal halide lamp or the high-pressure mercury lamp, which is commonly employed as the light source of the liquid crystal projector, emits light which is rich in the green region but is relatively poor in the blue and red regions. Consequently, the arrangement shown in FIG. 18 allows to utilize the lights of such blue and red regions in efficient manner, thereby providing a bright projected image on the screen.

Again referring to FIG. 14, the R, G and B lights from the color separation element 3-3 enter the condenser lens 4 at respectively different angles in a plane perpendicular to the plane of the drawing, and are so condensed by the condenser lens 4 as to form images of the light source in the vicinity of mirrors 24, 5, 6 which are provided in a mutually spaced and mutually inclined manner in the vicinity of the diaphragm 28 of the projection optical system 22.

The G light beam, lying in the plane of FIG. 14, is reflected by the mirror 24, and converted by the field lens 17 into a substantially parallel light beam, which illuminates the reflective liquid crystal panel 25 obliquely from above. The light beam modulated by the image information displayed on the liquid crystal panel 25 is reflected thereby obliquely downwards, and is condensed by the field lens 17 so as to form an image of the light source again in a position between mirrors 20, 21 provided in the vicinity of the diaphragm 28 of the projection optical system 22.

FIG. 14 shows a configuration in which the light beams from the dichroic mirrors enter perpendicularly to the optical axis 22a of the projection optical system 22, but an oblique entry to the optical axis 22a may also be achieved by suitable variations of the angles of the mirrors 24, 5, 6. As an example, an entry at an inclination angle 30° to the optical axis allows to realize an incident angle θ of 30° in the configuration shown in FIG. 16. A smaller incident angle to the dichroic mirror enables to reduce the number of deposited layers required thereof, thus facilitating the manufacture thereof. On the other hand, such effect is difficult to attain if the direction of separation of the light beams of respective colors is selected same as that of deflection of the light beams by reflection, as the incident angle θ becomes about 45° in consideration of the ease of arrangement of the optical systems. Now there will be given an explanation of the R and B light beams, with reference to FIG. 15. The R light beam is reflected in succession by the mirrors 5, 29, and converted by the field lens 18 into a substantially parallel light beam which illuminates the reflective liquid crystal panel 26. The light beam modulated by the image information displayed on the liquid crystal panel 26 is reflected thereby in a direction opposite to the direction of the incident light, and is condensed by the field lens 18 so as to form an image of the light source again on the mirror 20 provided in the vicinity of the diaphragm 28 of the projection optical system 22.

Similarly the B light beam is reflected in succession by the mirrors 6, 30, and converted by the field lens 19 into a substantially parallel light beam which illuminates the reflective liquid crystal panel 27. The light beam modulated by the image information displayed on the liquid crystal panel 27 is reflected thereby in a direction opposite to the direction of the incident light, and is condensed by the field lens 19 so as to form an image of the light source again on the mirror 21 provided in the vicinity of the diaphragm 28 of the projection optical system 22.

The G light beam passes through the gap between the mirrors 20, 21 while the R and B light beams are respectively reflected by the mirrors 20, 21, thus all entering the projection optical system 22, which thus projects the image information of the liquid crystal panels 25, 26, 27 on the screen 23 and synthesizing a full-color image thereon.

The positional relationship among the field lenses 17, 18, 19, the reflective liquid crystal panels 25, 26, 27 and the mirrors 20, 21 is similar to that in the embodiment 2. More specifically, the liquid crystal panels are provided in the optically equivalent positions with respect to the projection optical system 22, and the light beams from the respective liquid crystal panels pass through respectively different portions of the diaphragm 28 of the projection optical system 22, and synthesizes a full-color image on the screen 23.

The images of the light source, formed by the R, G and B light beams coming from the field lenses 17, 18, 19 have such sizes as to meet the diaphragm 28 of the projection optical system 22, thereby achieving efficient utilization of the light beams. The color separation optical system and the color synthesizing optical system are so constructed as to position the green light beam at the central portion of the diaphragm 28 of the projection optical system 22 while positioning the blue and red light beams in the peripheral portions of the diaphragm, thereby obtaining a projected image of a high resolution.

The mirrors in the present embodiment are composed of aluminum mirrors of high reflectivity, optimized to the wavelength regions as in the embodiment 2, thereby improving the efficiency of utilization of the light and thus providing a bright image on the screen.

The three flat dichroic mirrors or the combination of the two dichroic mirrors and a high-reflectivity mirror of the present embodiment, as shown in FIGS. 16, 17 and 18, can be relatively easily manufactured. Also the high-reflectivity mirrors 24, 5, 6 for guiding the light beams from the diffraction grating to the respective liquid crystal panels can be mirrors of small diameters, and those 20, 21 for synthesizing the light from the liquid crystal panels can also be mirrors of small diameters.

The liquid crystal panels suitable for the present embodiment can be, for example, polymer dispersion liquid crystal panels as in the embodiment 2.

As explained in the foregoing, the color separation optical system and the color synthesizing optical system of the present embodiment can be principally composed of mirrors of high reflectivity, even in the combination with the reflective liquid crystal panels, instead of the cross dichroic prisms which are difficult to produce. Also the present embodiment, being free from passing of the light beams through the inclined flat dichroic mirrors as in the conventional configuration, does not cause astigmatism, thereby providing an image with satisfactory resolution.

Figure 19:
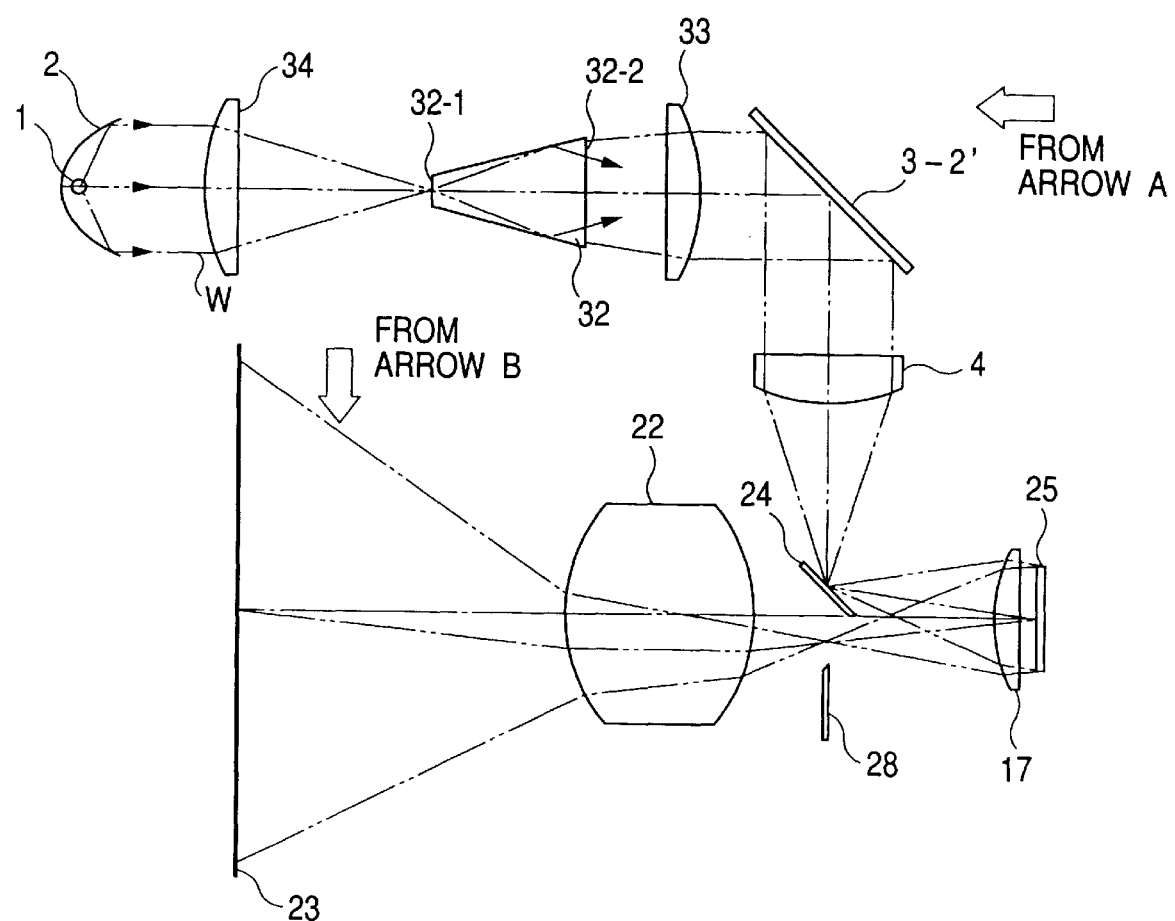
FIG. 19 is a schematic elevation view of an embodiment 5 of the present invention.

FIG. 19 is a schematic view of an embodiment 5 of the present invention, which is same in configuration as the foregoing embodiment 3 shown in FIG. 10 except that an integrator 32 and lenses 33, 34 are provided between the light source 1 and the reflective diffraction grating 3-2'. A view seen from a direction A in FIG. 19 is omitted because it is similar to FIG. 11, and a view seen from a direction B in FIG. 19 is omitted because it is similar to FIG. 7. Furthermore, a view showing the optical system positioned below the optical axis of the projection optical system 22 is omitted as it is similar to FIG. 8.

In FIG. 19, optical components equivalent to those in FIGS. 5 and 10 are represented by same numbers. The configuration shown in FIG. 19 employs the diffraction grating 3-2' as the reflective color separation element, as shown in FIG. 12, of the embodiment 3 of the present invention.

Referring to FIG. 19, the light emitted from the light source 1 is converted by the reflector (parabolic mirror) 2 into a substantially parallel light beam, which is focused by a condenser lens (condenser means) 34 as an image of the light source at the front end face (first end face) 32-1 of an integrator 32. The light beam entering the integrator 32 is in a part transmitted, while the remaining part is reflected therein by once to several times, and is emitted from the rear end face (second end face) 32-2.

Figure 20:
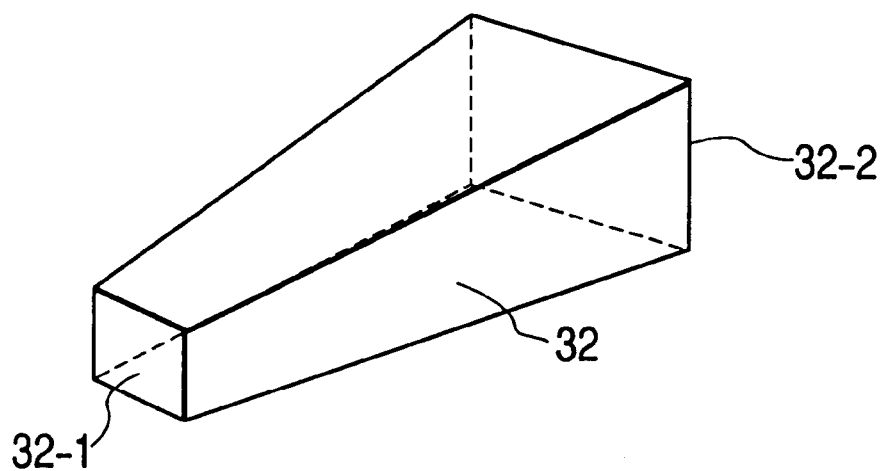
FIGS. 20, 21, 22A, 22B and 22C are schematic partial views of the embodiment 5 shown in FIG. 19.

FIG. 20 shows the shape of a glass rod suitable for use in the integrator 32 to be employed in the embodiment 5 of the present invention. It has a hexahedral shape, obtained by cutting the head portion of a rectangular cone with a plane parallel to the bottom face thereof. It has a front end face 32-1 where the light beam enters and a rear end face 32-2 where the light beam emerges, and both end faces are connected with four tapered faces.

In the configuration shown in FIG. 20, all the four lateral faces are tapered, but, for example two of such four lateral faces may be mutually parallel faces. The both end faces and the four lateral faces are optically polished, and the lateral faces are selected at such tapered angles as to cause total reflection of the light beam. Within the light beam entering the glass rod, a portion substantially perpendicularly entering the front end face is transmitted by the glass rod, while the other portion obliquely entering the front end face is totally reflected once to several times inside the glass rod and is emitted from the rear end face.

Figure 21:
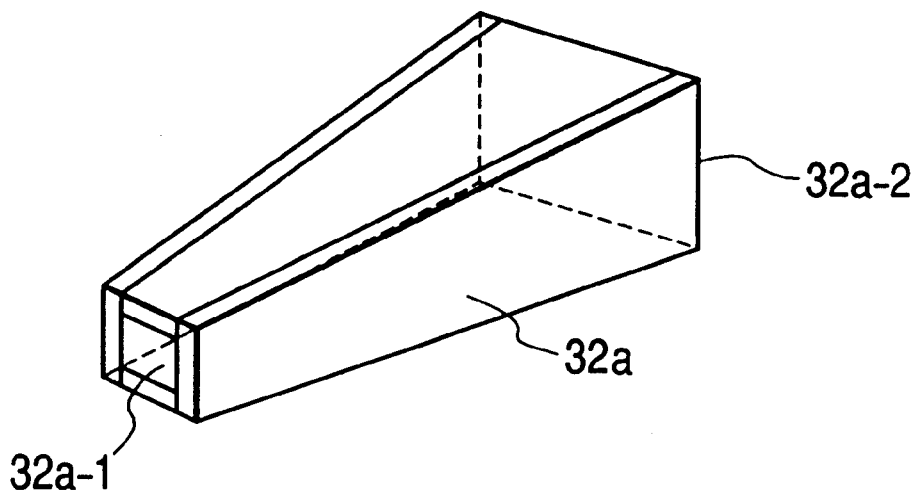

FIG. 21 shows the shape of a kaleidoscope suitable for use in the integrator 32a to be employed in the embodiment 5 of the present invention. As in the case of the glass rod, it has a hexahedral shape, obtained by cutting the head portion of a rectangular cone with a plane parallel to the bottom face thereof. It has a front end face 32a-1 where the light beam enters and a rear end face 32a-2 where the light beam emerges, and both end faces are connected with four tapered faces.

In the configuration shown in FIG. 21, all the four lateral faces are tapered, but, for example two of such four lateral faces may be mutually parallel faces.

The four lateral faces are composed of trapezoidal flat mirrors, having the mirror faces thereof at the inside and assembled in such a manner that the edges thereof are mutually jointed. A hollow space is maintained between the front end face 32a-1 and the rear end face 32a-2. Of the light beam entering the kaleidoscope, a portion substantially perpendicularly entering the front end face is transmitted by the kaleidoscope, while the other portion obliquely entering the front end face is reflected once to several times by the mirrors constituting the lateral walls of the kaleidoscope and is emitted from the rear end face.

Again referring to FIG. 19, the light beam from the integrator 32 is converted by a convex lens (lens system) 32 into a substantially parallel light beam, and enters the diffraction grating 3-2' constituting the reflective color separation element, which separates the white light W into light beams corresponding to red, green and blue wavelength regions. The reflective diffraction grating 3-2' is positioned in the substantially parallel light beam, in order to avoid unevenness of the illumination in color and in luminance resulting from the dependence of the spectral characteristics of the diffraction grating on the incident angle.

The R, G and B lights from the diffraction grating 3-2' enter the condenser lens 4 at respectively different angles in a plane perpendicular to the plane of the drawing, and are so condensed by the condenser lens 4 as to form images of the light source in the vicinity of the mirrors 24, 5, 6 which are provided in a mutually spaced and mutually inclined manner in the vicinity of the diaphragm 28 of the projection optical system 22. The G light beam, lying in the plane of FIG. 19, is reflected by the mirror 24, and converted by the field lens 17 into a substantially parallel light beam, which illuminates the reflective liquid crystal panel 25 obliquely from above.

It is important, in the optical system of the present embodiment, that the rear end face 32-2 of the integrator 32 is focused on the faces of the liquid crystal panels 25, 26, 27 by an optical system composed of the convex lens 33, the condenser lens 4 and the field lenses 17, 18, 19. On the rear end face 32-2 of the integrator 32, the lights transmitted through the integrator 32 and reflected once to several times in the integrator 32 are superposed whereby the unevenness of the light source in color and in luminance is almost corrected. Consequently, if such rear end face is made optically conjugate with the faces of the liquid crystal panels through the convex lens 33, the condenser lens 4 and the field lens 17, the unevenness in color and in luminance is alleviated on such faces of the liquid crystal panels, thereby reducing such unevenness on the screen.

Also the rear end face 32-2 of the integrator 32 may be formed as rectangular shape substantially similar to the shape of the liquid crystal panels, and an efficient illumination can be achieved by establishing an appropriate magnification relationship between the two.

The light beam modulated by the image information displayed on the liquid crystal panel 25 is reflected thereby obliquely downwards, and is condensed by the filed lens 17 so as to form an image of the light source again in a position between mirrors 20, 21 provided in the vicinity of the diaphragm 28 of the projection optical system 22.

Now there will be given an explanation of the R and B light beams, with reference to FIG. 11. The R light beam is reflected in succession by the mirrors 5, 29, and converted by the filed lens 18 into a substantially parallel light beam which illuminates the reflective liquid crystal panel 26. The light beam modulated by the image information displayed on the liquid crystal panel 26 is reflected thereby in a direction opposite to the direction of the incident light, and is condensed by the field lens 18 so as to form an image of the light source again on the mirror 20 provided in the vicinity of the diaphragm 28 of the projection optical system 22.

Similarly the B light beam is reflected in succession by the mirrors 6, 30, and converted by the field lens 19 into a substantially parallel light beam which illuminates the reflective liquid crystal panel 27. The light beam modulated by the image information displayed on the liquid crystal panel 27 is reflected thereby in a direction opposite to the direction of the incident light, and is condensed by the field lens 19 so as to form an image of the light source again on the mirror 21 provided in the vicinity of the diaphragm 28 of the projection optical system 22.

The G light beam passes through the gap between the mirrors 20, 21 while the R and B light beams are respectively reflected by the mirrors 20, 21, thus all entering the projection optical system 22, which thus projects the image information of the liquid crystal panels 25, 26, 27 on the screen 23 and synthesizing a full-color image thereon.

The positional relationship among the field lenses 17, 18, 19, the reflective liquid crystal panels 25, 26, 27 and the mirrors 20, 21 is similar to that in the embodiment 2. More specifically, the liquid crystal panels are provided in the optically equivalent positions with respect to the projection optical system 22, and the light beams from the respective liquid crystal panels pass through respectively different portions of the diaphragm 28 of the projection optical system 22, and synthesizes a full-color image on the screen 23.

The images of the light source, formed by the R, G and B light beams coming from the field lenses 17, 18, 19 have such sizes as to meet the diaphragm 28 of the projection optical system 22, thereby achieving efficient utilization of the light beams. The color separation optical system and the color synthesizing optical system are so constructed as to position the green light beam at the central portion of the diaphragm 28 of the projection optical system 22 while positioning the blue and red light beams in the peripheral portions of the diaphragm, thereby obtaining a projected image of a high resolution.

The first end face 32-1 of the integrator 32 and the diaphragm 28 of the projection optical system 22 are maintained optically conjugate by an optical system (33, 4, 17, 18, 19) provided between the second end face 32-2 and the optical modulation element.

In the following there will be explained the feature of the arrangement of mirrors in the illumination optical system of the embodiment 5 of the present invention, with reference to FIGS. 22A, 22B and 22C, which respectively show the optical paths of the R, G and B light beams. The light beam from the condenser lens 4 enters from the direction of Z-axis, and the liquid crystal panels 26, 27 are positioned in the direction of X-axis while the liquid crystal panel 25 is positioned in the direction of Y-axis. Also the optical axis of the projection optical system 22 is in the direction of the Y-axis.

Figure 22A:
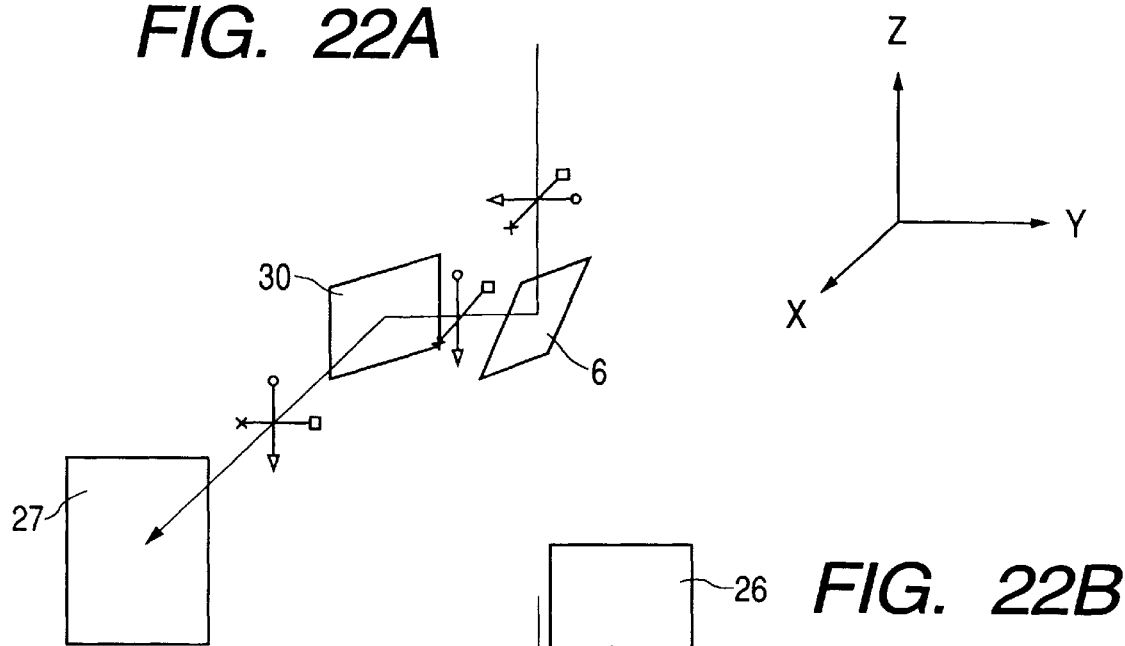

Referring to FIG. 22A, the light beam from the condenser lens 4 is deflected by reflection by a mirror 6 to enter a mirror 30, then deflected again by the mirror 30 and enters the liquid crystal panel 27. The normal line to the mirror 6 is in the YZ plane, while that to the mirror 30 is in the XY plane. Each plane containing such normal line to the mirror is parallel or perpendicular to the liquid crystal panel. The image on the rear end face 32-2 of the integrator 32 is inverted vertically and/or laterally, but is not rotated about the optical axis.

Figure 22B:
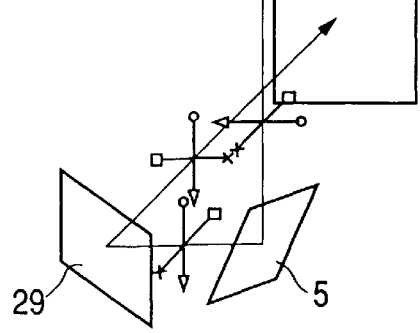

Referring to FIG. 22B, the light beam from the condenser lens 34 is deflected by reflection by a mirror 5 to enter a mirror 29, then deflected again by the mirror 29 and enters the liquid crystal panel 26. The normal line to the mirror 5 is in the YZ plane, while that to the mirror 29 is in the XY plane. Each plane containing such normal line to the mirror is parallel or perpendicular to the liquid crystal panel. The image on the rear end face 32-2 of the integrator 32 is inverted vertically and/or laterally, but is not rotated about the optical axis.

Figure 22C:
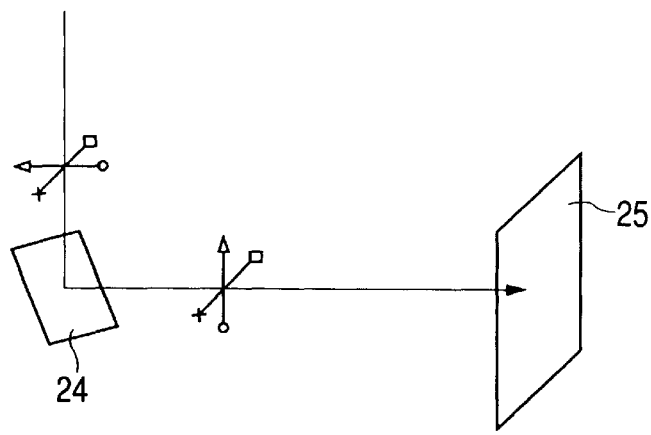

Referring to FIG. 22C, the light beam from the condenser lens 34 is deflected by reflection by a mirror 24 and enters the liquid crystal panel 25. The normal line to the mirror 24 is in the YZ plane. The plane containing such normal line to the mirror is perpendicular to the liquid crystal panel. The image on the rear end face 32-2 of the integrator 32 is inverted vertically, but is not rotated about the optical axis.

If the rectangular image at the rear end face 32-2 of the integrator 32 is rotated, the illumination area has to be made wider in order to illuminate the likewise rectangular liquid crystal panel while taking such image rotation into consideration. Such wider illumination area will deteriorate the illumination efficiency, thus providing a darker projected image on the screen. In contrast, the arrangement of the mirror in the illumination optical system of the present embodiment improves the illumination efficiency, thus allowing to obtain a bright projected image on the screen.

The mirrors in the present embodiment are composed of aluminum mirrors of high reflectivity, optimized to the wavelength regions as in the embodiment 2, thereby improving the efficiency of utilization of the light and thus providing a bright image on the screen.

The diffraction grating 3-2', employed as the color separation element in the present embodiment, can be relatively easily mass manufactured by the replica technology. Also the high-reflectivity mirrors 24, 5, 6 for guiding the light beams from the diffraction grating to the respective liquid crystal panels can be mirrors of a small diameter, and those 20, 21 for synthesizing the light from the liquid crystal panels can also be mirror of a small diameter.

The liquid crystal panels suitable for the present embodiment can be, for example, polymer dispersion liquid crystal panels as in the embodiment 2.

As explained in the foregoing, the color separation optical system and the color synthesizing optical system of the present embodiment can be principally composed of mirrors of high reflectivity, even in the combination with the reflective liquid crystal panels, instead of the cross dichroic prisms which are difficult to produce.

Also the present embodiment, being free from passing of the light beams through the inclined flat dichroic mirrors as in the conventional configuration, does not cause astigmatism, thereby providing an image with satisfactory resolution.

Furthermore, the arrangement of the mirrors in the illumination optical system of the present embodiment provides an advantage of improving the illumination efficiency, thus providing a bright projected image on the screen.

FIGS. 23 to 26 are schematic views of an embodiment 6 of the present invention, which is same in configuration as the embodiment 2 shown in FIGS. 5 to 9, except that at least a mirror of the illumination optical system is positioned three-dimensionally.

Figure 23:
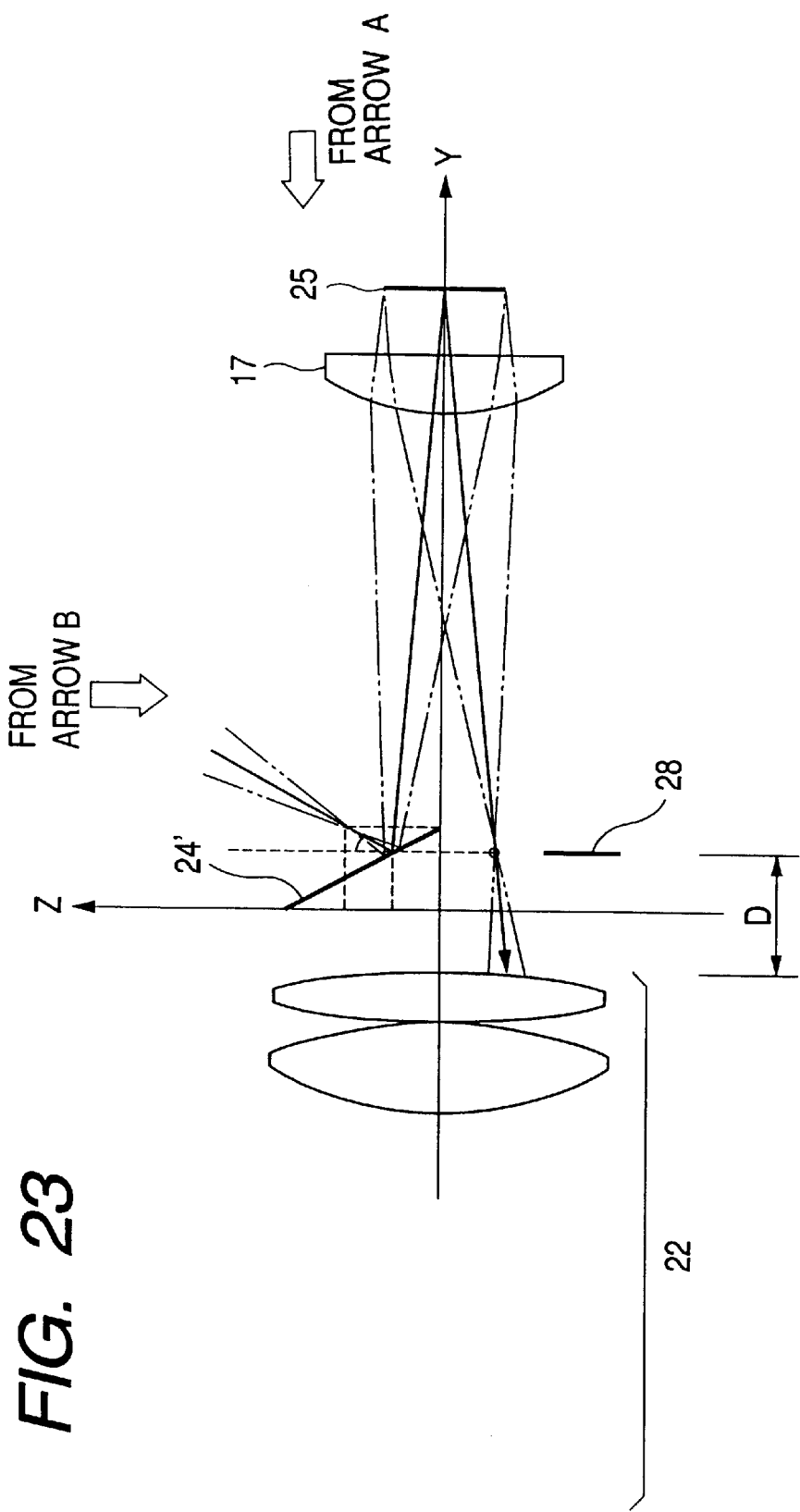
FIG. 23 is a schematic elevation view of an embodiment 6 of the present invention.
Figure 24:
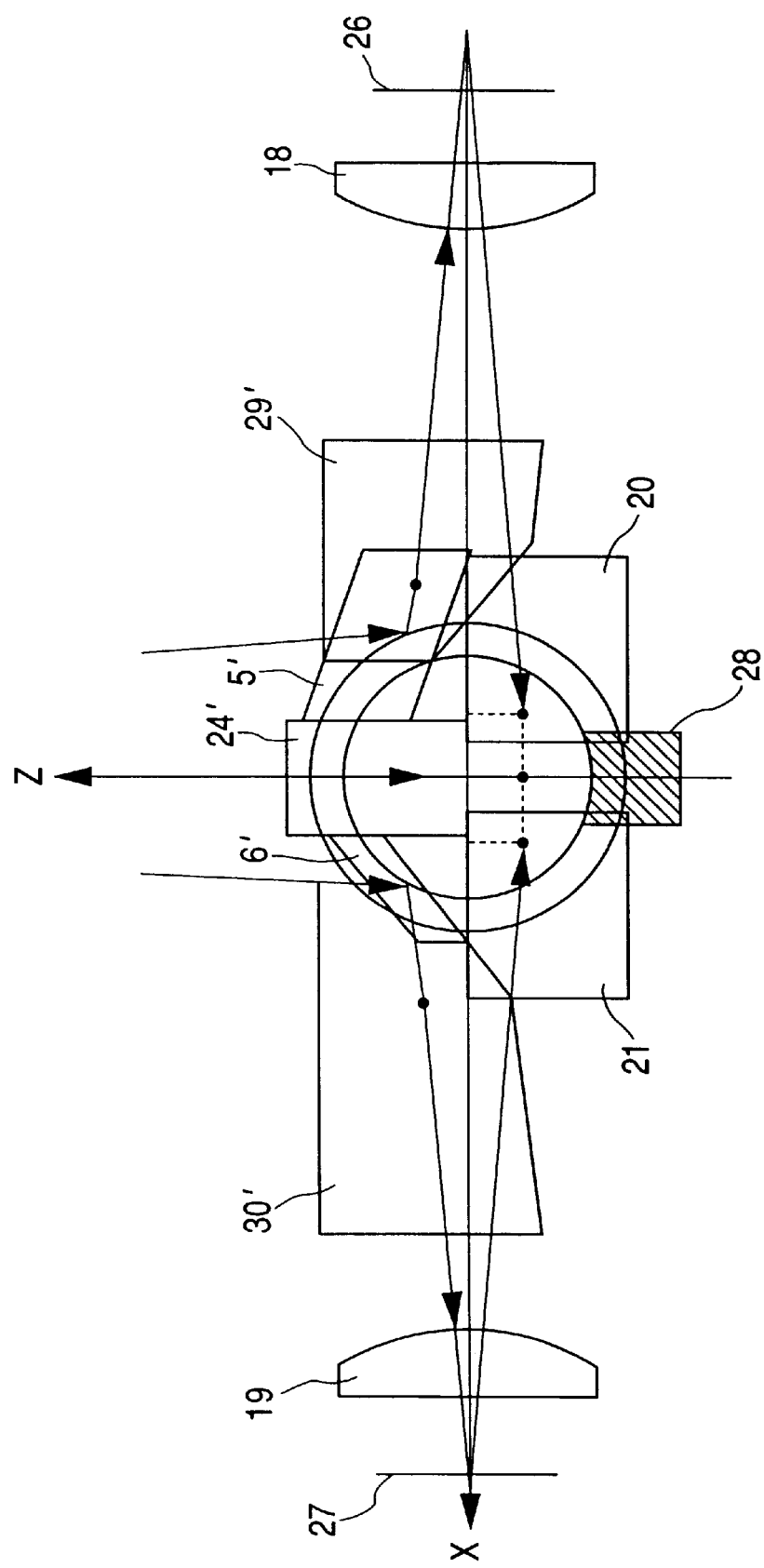
FIGS. 24 and 25 are views, respectively seen from directions A and B, of the embodiment 6 shown in FIG. 23.
Figure 25:
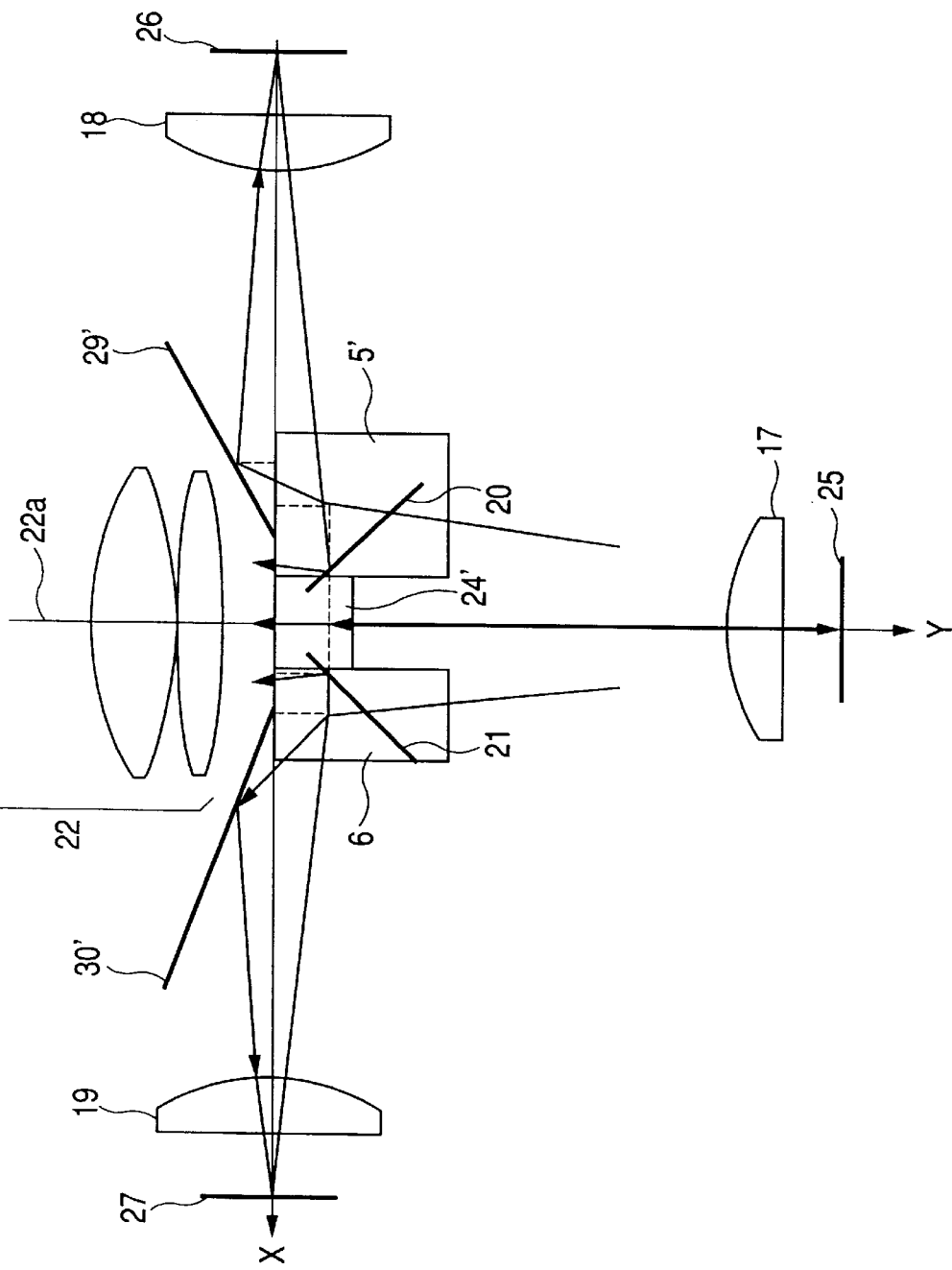
Figure 26:
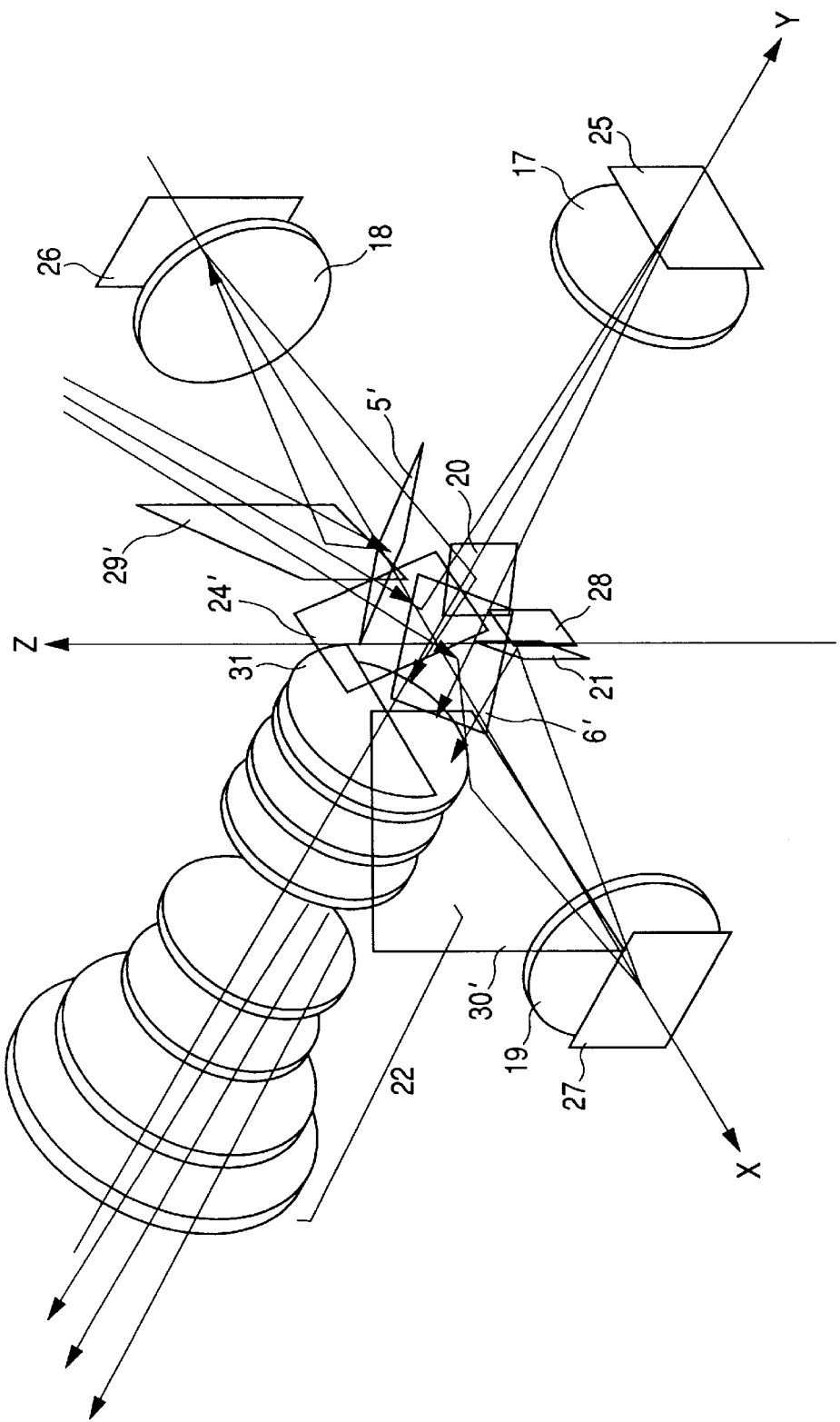
FIG. 26 is a partial perspective view of the embodiment 6 of the present invention.

FIG. 23 is a schematic elevation view, while FIGS. 24 and 25 are views respectively seen from directions A and B in FIG. 23, and FIG. 26 is a perspective view showing the arrangement of the mirrors in the color separation optical system and the color synthesizing optical system. The optical components from the light source 1 and the reflector 2 to the condenser lens 4 are omitted in these drawings. The color separation element may be composed of a transmissive or reflective diffraction grating, or a combination of three dichroic mirrors. In FIGS. 23 to 26, optical components equivalent to those in FIGS. 5 to 9 are represented by corresponding numbers.

Referring to FIG. 23, the R, G and B light beams from the color separation element enter the condenser lens 4 (not shown) at respectively different angles in a direction perpendicular to the plane of FIG. 23. The light beams from the light source are condensed by the condenser lens 4 so as to form images of the light source in the vicinity of mirrors 24', 5', 6' provided in a mutually spaced and mutually inclined manner in the vicinity of the diaphragm 28 of the projection optical system 22 (of which only the rearmost lens is illustrated).

In the present embodiment, the light beams enter, by an inclination of 60°, with respect to the optical axis 22a of the projection optical system 22. The G light beam, lying in the plane of FIG. 23, is reflected by the mirror 24', and converted by the field lens 17 into a substantially parallel light beam, which illuminates the reflective liquid crystal panel 25 obliquely from above. The light beam modulated by the image information displayed on the liquid crystal panel 25 is reflected thereby obliquely downwards, and is condensed by the field lens 17 so as to form an image of the light source again in a position between mirrors the 20, 21 provided in the vicinity of the diaphragm 28 of the projection optical system 22.

Now there will be given an explanation on the R and B light beams, with reference to FIGS. 24 and 25. The R light beam is reflected in succession by mirrors 5', 29', and converted by the field lens 18 into a substantially parallel light beam which illuminates the reflective liquid crystal panel 26. The light beam modulated by the image information displayed on the liquid crystal panel 26 is reflected thereby in a direction opposite to the direction of the incident light, and is condensed by the field lens 18 so as to form an image of the light source again on the mirror 20 provided in the vicinity of the diaphragm 28 of the projection optical system 22. The mirror 5' is inclined three-dimensionally, and a plane containing the normal line to the mirror is not parallel nor perpendicular to the face of the liquid crystal panel 26. The mirror 29' is so inclined that the normal line thereto is in the YZ plane.

Similarly the B light beam is reflected in succession by mirrors 6', 30', and converted by the field lens 19 into a substantially parallel light beam which illuminates the reflective liquid crystal panel 27. The light beam modulated by the image information displayed on the liquid crystal panel 27 is reflected thereby in a direction opposite to the direction of the incident light, and is condensed by the field lens 19 so as to form an image of the light source again on the mirror 21 provided in the vicinity of the diaphragm 28 of the projection optical system 22. The mirror 6' is inclined three-dimensionally, and a plane containing the normal line to the mirror is not parallel nor perpendicular to the face of the liquid crystal panel 27. The mirror 30' is so inclined that the normal line thereto is in the YZ plane.

The G light beam passes through the gap between the mirrors 20, 21 while the R and B light beams are respectively reflected by the mirrors 20, 21, thus all entering the projection optical system 22, which thus projects a full-color image on the screen 23.

The positional relationship among the field lenses 17, 18, 19, the reflective liquid crystal panels 25, 26, 27 and the mirrors 20, 21 is similar to that in the embodiment 2. More specifically, the liquid crystal panels are provided in the optically equivalent positions with respect to the projection optical system 22, and the light beams from the respective liquid crystal panels pass through respectively different portions of the diaphragm 28 of the projection optical system 22, and synthesizes a full-color image on the screen 23.

The images of the light souce, formed by the R, G and B light beams coming from the field lenses 17, 18, 19 have such sizes as to meet the diaphragm 28 of the projection optical system 22, thereby achieving effecient utilization of the light beams. The color separation optical system and the color synthesizing optical system are so constructed as to position the green light beam at the central portion of the diaphragm 28 of the projection optical system 22 while positioning the blue and red light beams in the peripheral portions of the diaphragm, thereby obtaining a projected image of a high resolution.

FIG. 26 is a perspective view showing the arrangement of the mirrors 24', 5', 6', 29' in the color separation/illumination opeical system and the mirrors 20, 21 in the color systhesizing optical system. The positional relationship of these mirrors will be understood from this drawing. A light shield plate 31, positioned in the upper half of the rearmost lens of the projection optical system 22 serves to prevent the direct entry of the stray light from the color separation/illumination optical system into the projection optical system 22, and allows to obtain a projected image of a high contrast, without the stray light.

The present embodiment is featured in the mirror arrangement of the illumination optical system that at least a mirror is three-dimensionally arranged. The plane containing the normal line to the mirror is not parallel nor perpendicular to the liquid crystal panel. Such arrangement allows to reduce, in comparison with the optical arrangement of the embodiment 5, the distance D from the rearmost lens of the projection optical system 22 to the diaphragm 28 thereof shown in FIG. 23.

In case of combining the reflective liquid crystal panels with the optical system of the present invention, since the mirrors 24', 5', 6' have to be positioned in the vicinity of the diaphragm of the projection optical system, it is generally necessary to position the diaphragm of the projection optical system significantly behind the lens thereof and to adopt the projection optical system of a retrofocus type. In consideration of the space required for placing the mirrors, a larger distance D increases the level of retrofocus of the projection optical system, leading to a complication of the projection optical system such as an increase in the number of the lens elements or necessity of incorporating special lenses such as aspherical lenses.

In contrast, the present embodiment intends to simplify the projection optical system by the reduction of the distance D through the appropriate mirror arrangement.

The mirrors in the present embodiment are composed of aluminum mirrors of high reflectivity, optimized to the wavelength regions as in the embodiment 2, thereby improving the efficiency of utilization of the light and thus providing a bright image on the screen. Also the high-reflectivity mirrors 24', 5', 6', 29', 30' for guiding the light beams from the color separation element to the respective liquid crystal panels can be mirrors of small diameters, and those 20, 21 for synthesizing the light from the liquid crystal panels can also be mirrors of small diameters.

The liquid crystal panels suitable for the present embodiment can be, for example, polymer dispersion liquid crystal panels as in the embodiment 2.

As explained in the foregoing, the color separation optical system and the color synthesizing optical system of the present embodiment can be principally composed of mirrors of high reflectivety, even in the combination with the reflective liquid crystal panels, instead of the cross dichroic prisms which are difficult to produce.

Also the present embodiment, being free from passing of the light beams through the inclined flat dichroic mirrors as in the conventional configuration, does not cause astigmatism, thereby providing an image with satisfactory resolution.

Figure 27:
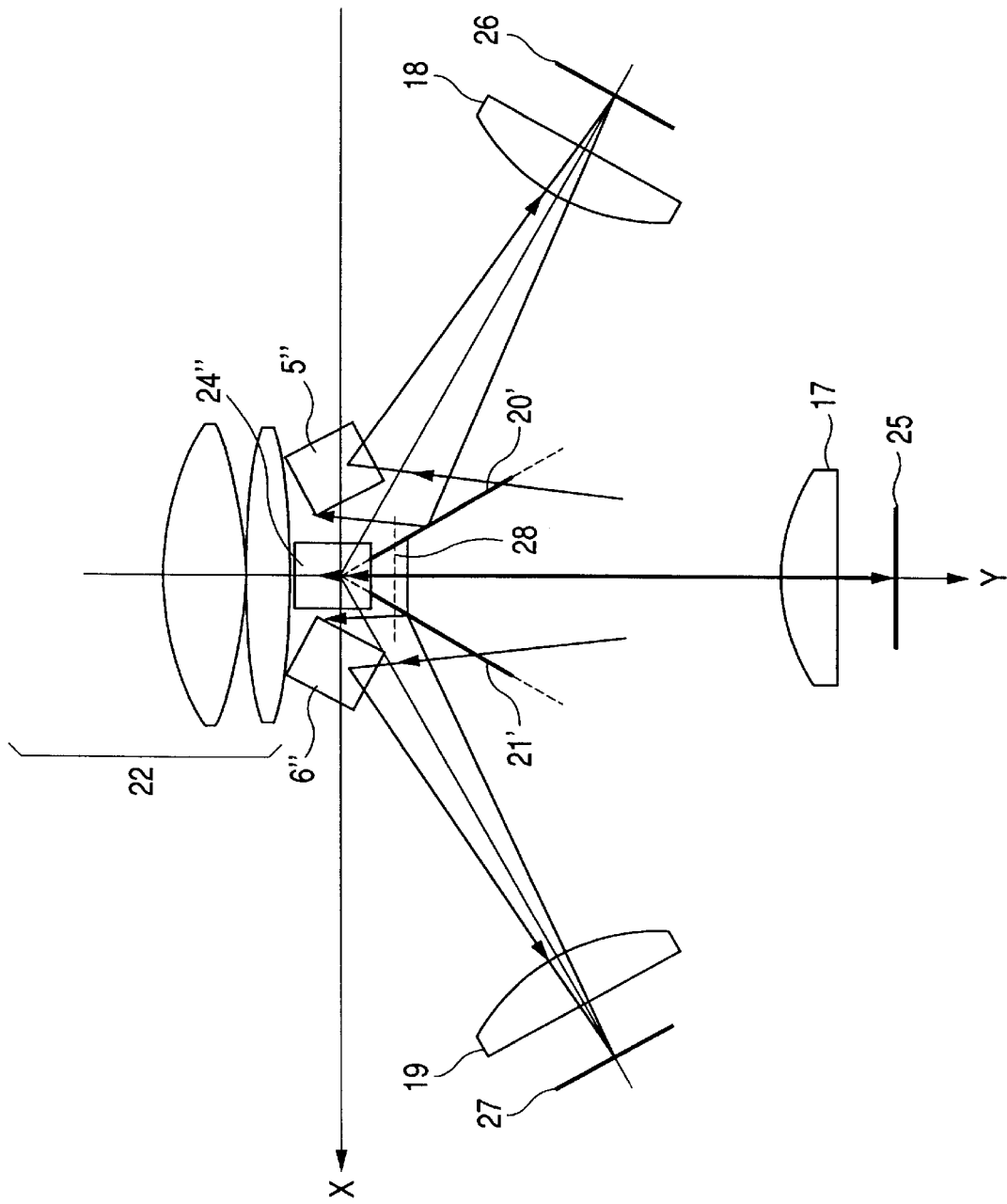
FIG. 27 is a partial perspective view of an embodiment 7 of the present invention.
Figure 28:
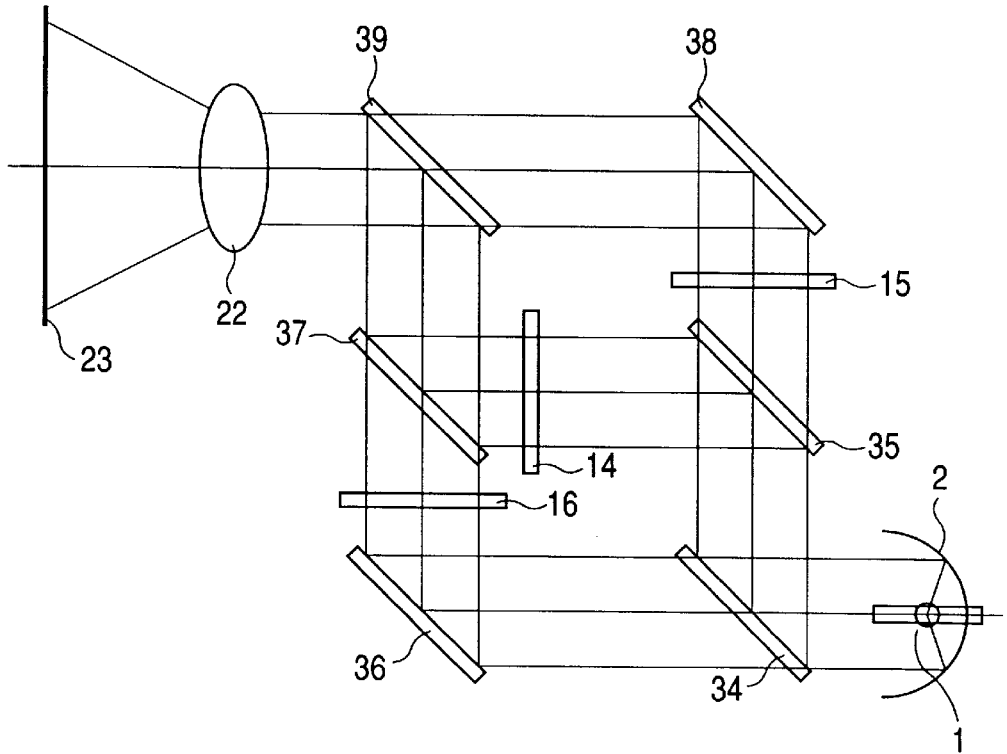
FIGS. 28, 29, 30, 31A and 31B are schematic views of conventional image projection apparatuss.
Figure 29:
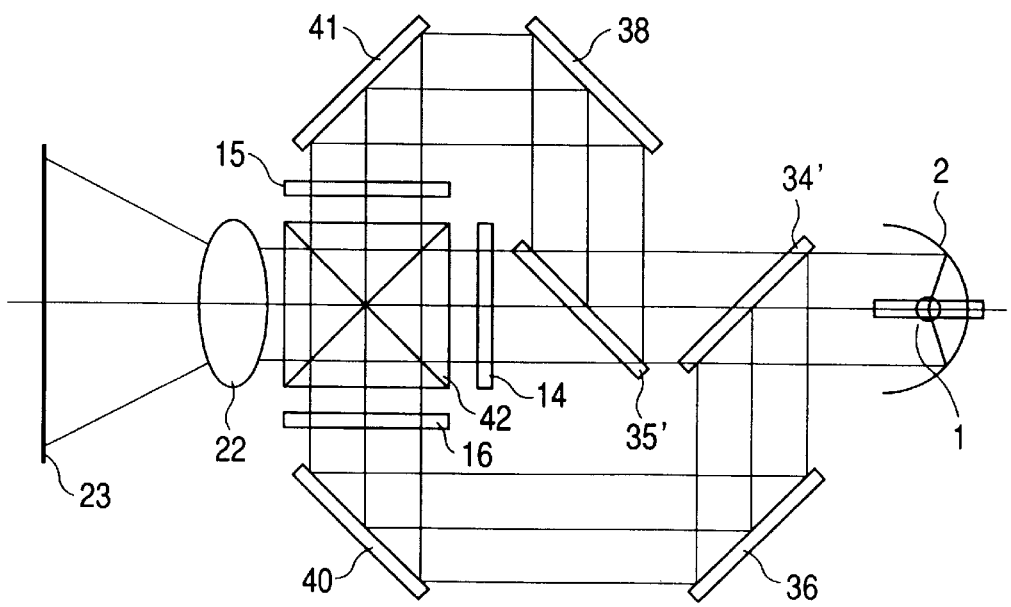
Figure 30:
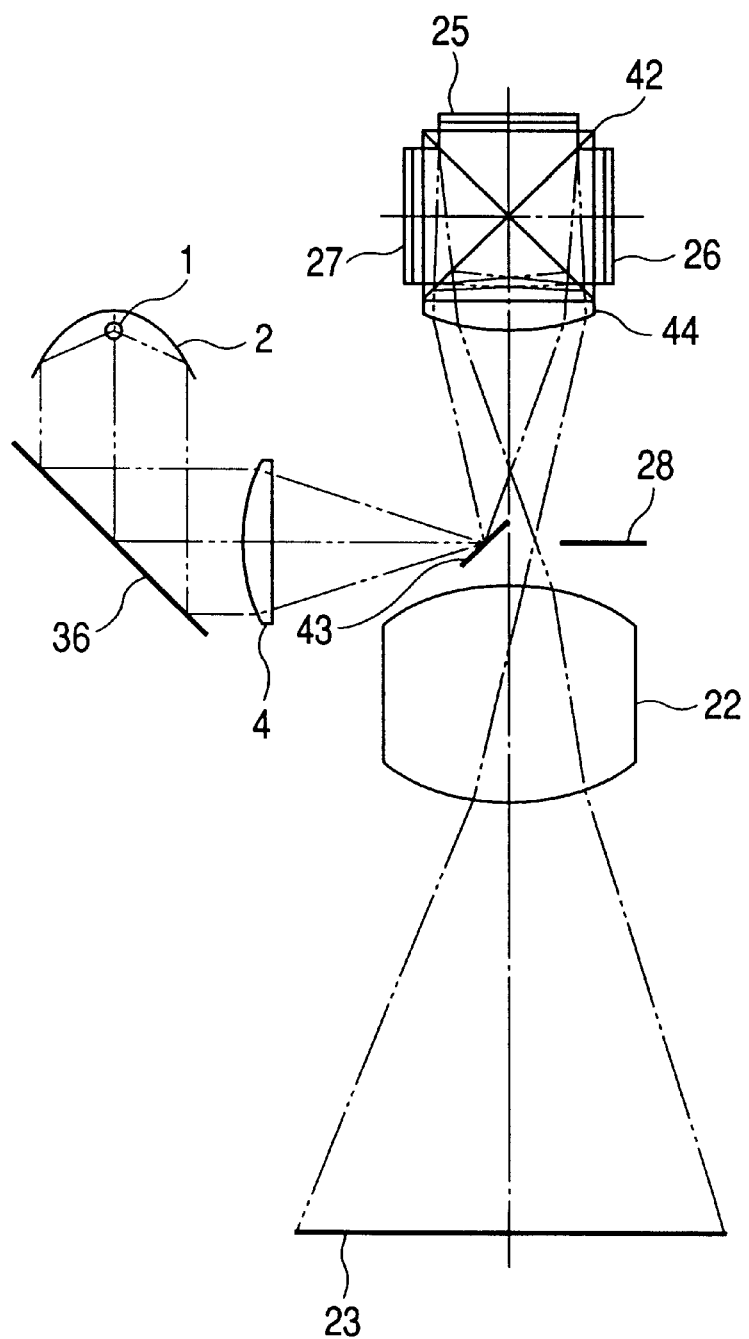
Figure 31A:
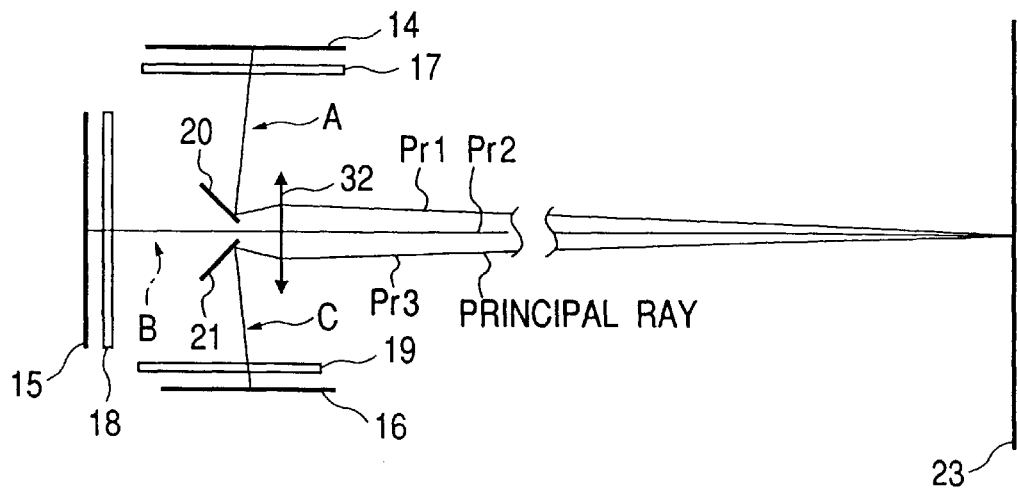
Figure 31B:
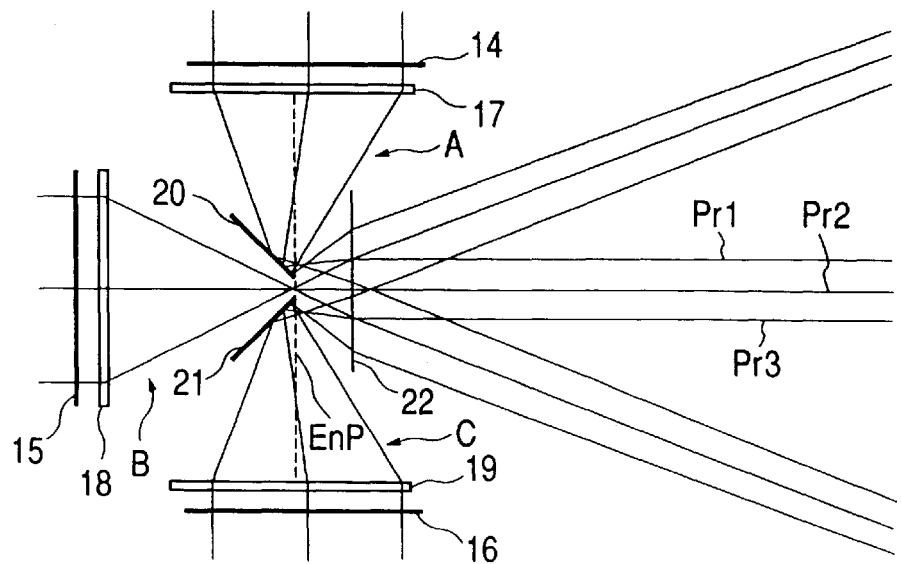
Figure 32:
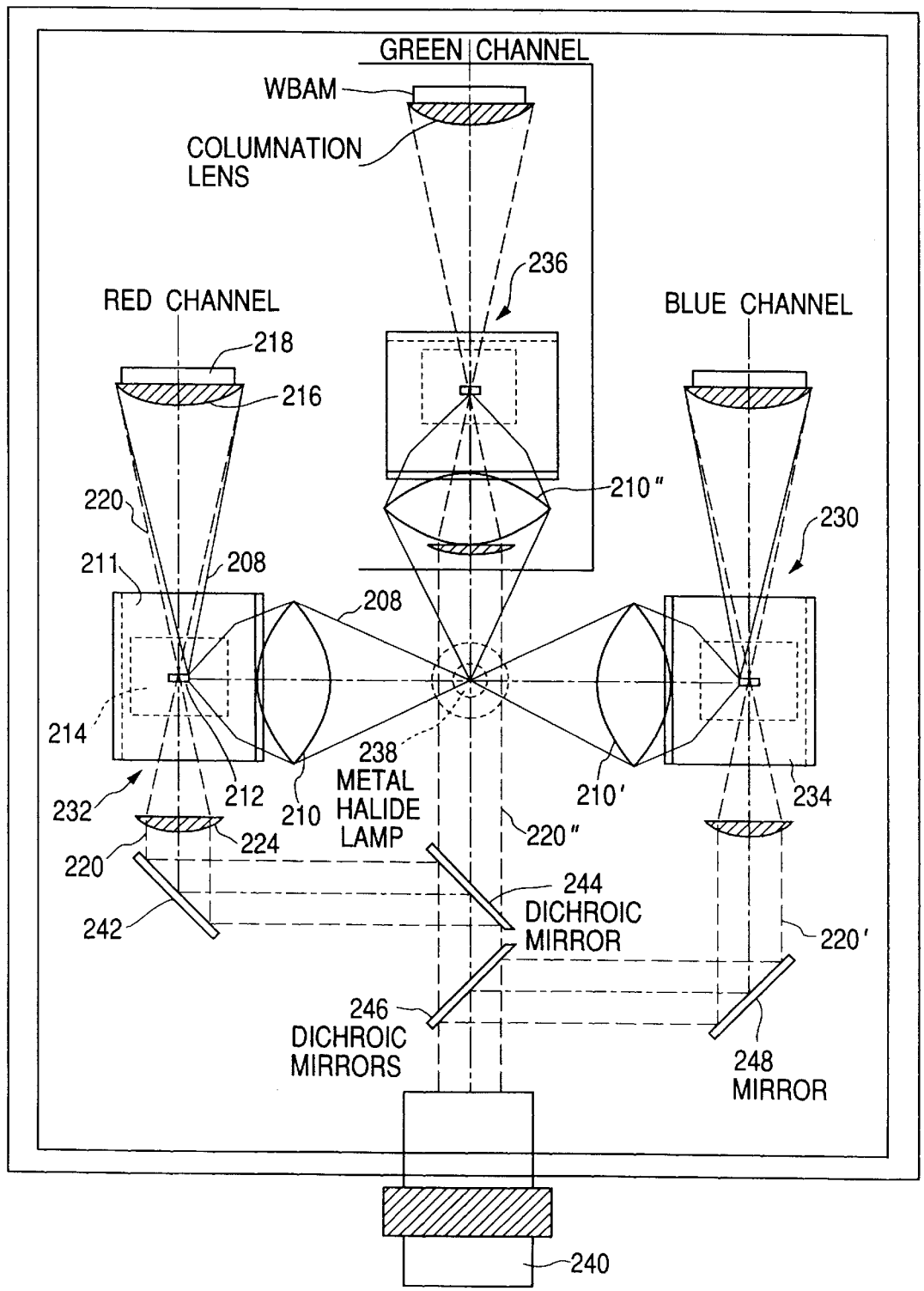
FIG. 32 is a schematic view of a conventional color image projection apparatus.

FIG. 27 is a partial schematic view of an embodiment 7 of the present invention, which is same as the foregoing embodiment 6 except that the field lens and the liquid crystal panel for each color light beam are arranged in a non-perpendicular relationship and the mirrors are arranged three-dimensionally. In the elevation view, the present embodiment is same as shown in FIG. 23. FIG. 27 is a view of the present embodiment seen from a direction B in FIG. 23. The color separation element may be composed of a transmissive or reflective diffraction grating, or a combination of three dichroic mirrors, In FIG. 27, optical components equivalent to those in FIG. 23 are represented by corresponding numbers.

Referring to FIG. 27, the R, G and B light beams from the color separation element enter the condenser lens 4 (not shown) at respectively different angles, and are condensed by the condenser lens 4 so as to form images of the light source in the vicinity of mirrors 24", 5", 6"positioned in a mutually spaced and mutually inclined manner in the vicinity of the diaphragm 28 of the projection optical system 22 (of which only the rearmost lens is illustrated).

In the present embodiment, the light beams enter, as shown in FIG. 23, at an inclination angle of 60° with respect to the optical axis 22a of the projection optical system 22. The G light beam is reflected by the mirror 24", and converted by the field lens 17 into a substantially parallel light beam, which illuminates the reflective liquid crystal panel 25 obliquely from above. The light beam modulated by the image information displayed on the liquid crystal panel 25 is reflected thereby obliquely downwards, and is condensed by a field lens 17 so as to form an image of the light source again in a position between mirrors the 20', 21' provided in the vicinity of the diaphragm 28 of the projection optical system 22.

The R light beam is reflected by the mirror 5", then enters a field lens 18 of which optical axis is inclined at 60° to the optical axis of the field lens 17, and the substantially parallel light beam obtained from the field lens 18 illuminates the reflective liquid crystal panel 26. The light beam modulated by the image information displayed on the liquid crystal panel 26 is reflected thereby in a direction opposite to the direction of the incident light, and is condensed by the field lens 18 so as to form an image of the light source again on the mirror 20' provided in the vicinity of the diaphragm 28 of the projection optical system 22. The mirror 5"is inclined three-dimensionally, and a plane containing the normal line thereto is not parallel nor perpendicular to the face of the liquid crystal panel 26.

Similarly the B light beam is reflected by the mirror 6", then enters a field lens 19 of which optical axis is inclined at 60° to the optical axis of the field lens 17, and the substantially parallel light beam obtained from the field lens 19 illuminates the reflective liquid crystal panel 27. The light beam modulated by the image information displayed on the liquid crystal panel 27 is reflected thereby in a direction opposite to the direction of the incident light, and is condensed by the field lens 19 so as to form an image of the light source again on the mirror 21' provided in the vicinity of the diaphragm 28 of the projection optical system 22. The mirror 6"is inclined three-dimensionally, and a plane containing the normal line thereto is not parallel nor perpendicular to the face of the liquid crystal panel 27.

The G light beam passes through the gap between the mirrors 20', 21' while the R and B light beams are respectively reflected by the mirrors 20', 21', thus all entering the projection optical system 22, which thus projects a full-color image on the screen 23.

The positional relationship among the field lenses 17, 18, 19, the reflective liquid crystal panels 25, 26, 27 and the mirrors 20', 21' is similar to that in the embodiment 2. More specifically, the liquid crystal panels are provided in the optically equivalent positions with respect to the projection optical system 22, and the light beams from the respective liquid crystal panels pass through respectively different portions of the diaphragm 28 of the projection optical system 22, and synthesizes a full-color image on the screen 23.

The images of the light source, formed by the R, G and B light beams coming from the field lenses 17, 18, 19 have such sizes as to fill the diaphragm 28 of the projection optical system 22, thereby achieving efficient utilization of the light beams. The color separation optical system and the color synthesizing optical system are so constructed as to position the green light beam at the central portion of the diaphragm 28 of the projection optical system 22 while positioning the blue and red light beams in the peripheral portions of the diaphragm, thereby obtaining a projected image of a high resolution.

The present embodiment is characterized by the mirror arrangement of the illumination optical system in which the field lens and the liquid crystal panel for each color light beam are arranged in a non-perpendicular relationship and the mirror for guiding the light beam to the corresponding liquid crystal panel is arranged three-dimensionally. The plane containing the normal line to the mirror is not parallel nor perpendicular to the liquid crystal panel. Such arrangement allows to reduce, in comparison with the optical arrangement of the embodiment 5, the distance D from the rearmost lens of the projection optical system 22 to the diaphragm 28 thereof. Also the non-perpendicular arrangement of the field lens and the liquid crystal panel in each color allows to reduce the number of the mirrors in comparison with the embodiment 6.

In case of combining the reflective liquid crystal panels with the optical system of the present invention, since the mirrors have to be positioned in the vicinity of the diaphragm 28 of the projection optical system 22, it is generally necessary to position the diaphragm of the projection optical system significantly behind the lens thereof and to adopt the projection optical system of a retrofocus type. In consideration of the space required for placing the mirrors, a larger distance D increases the level of retrofocus of the projection optical system leading to a complication of the projection optical system such as an increase in the number of the lens elements or necessity of incorporating special lenses such as aspherical lenses.

Therefore, the present embodiment reduces the number of the mirrors to one by adopting an appropriate mirror arrangement, thereby decreasing the distance D and achieving simplification of the projection optical system. The projection optical system can also be simplified because of the reduced number of the mirrors.

The mirrors in the present embodiment are composed of aluminum mirrors of high reflectivity, optimized to the wavelength regions as in the embodiment 2, thereby improving the efficiency of utilization of the light and thus providing a bright image on the screen. Also the high-reflectivity mirrors 24", 5", 6" for guiding the light beams from the color separation element to the respective liquid crystal panels can be mirrors of small diameters, and those 20', 21' for synthesizing the light from the liquid crystal panels can also be mirrors of small diameters.

The liquid crystal panels suitable for the present embodiment can be, for example, dispersed polymer liquid crystal panels as in the embodiment 2.

As explained in the foregoing, the color separation optical system and the color synthesizing optical system of the present embodiment can be principally composed of mirrors of high reflectivity, even in the combination with the reflective liquid crystal panels, instead of the cross dichroic prisms which are difficult to produce. Also the present embodiment, being free from passing of the light beams through the inclined flat dichroic mirrors as in the conventional configuration, does not cause astigmatism, thereby providing an image with satisfactory resolution. Furthermore, the projection optical system can be simplified by a compact mirror arrangement, and can be simplified further by the reduced number of the mirrors.

What is claimed is:

1. An image projection apparatus comprising:

color separation means for color-separating light beam from a light source into plural color lights;

optical means for condensing the respective color lights separated by said color separation means;

first deflection means provided in the vicinity of at least one of the condensed positions of the respective color lights for guiding the color lights to corresponding optical modulation elements;

second deflection means for guiding the light beam to a projection optical system in accordance with at least one of said optical modulation elements; and said projection optical system through which image information in accordance with said optical modulation elements is projected, in mutually superposed manner, onto a predetermined plane, wherein said second deflection means is provided in the vicinity of a diaphragm of said projection optical system in such a manner as to divide an aperture of said diaphragm into plural areas.

2. An image projection apparatus comprising:

color separation means for color-separating light beam from a light source into plural color lights;

optical means for condensing the respective color lights separated by said color separation means;

first deflection means provided in the vicinity of at least one of the condensed positions of the respective color lights for guiding the color lights to corresponding reflective optical modulation elements;

second deflection means for guiding the light beam to a projection optical system in accordance with at least one of said optical modulation elements; and said projection optical system through which image information in accordance with said optical modulation elements is projected, in mutually superposed manner, onto a predetermined plane, wherein said first and second deflection means are provided in the vicinity of a diaphragm of said projection optical system in such a manner as to divide an aperture of said diaphragm into plural areas.

3. An image projection apparatus comprising:

color separation means for color-separating light beam from a light source into plural color lights;

optical means for condensing the respective color lights separated by said color separation means;

mirror means provided in the vicinity of at least one of the condensed positions of the respective color lights for guiding the color lights to corresponding reflective optical modulation elements;

deflection means for guiding the light beam to a projection optical system in accordance with at least one of said optical modulation elements; and said projection optical system through which image information in accordance with said optical modulation elements is projected in mutually superposed manner, onto a predetermined plane, wherein said mirror means and said deflection means are provided in the vicinity of a diaphragm of said projection optical system in such a manner as to divide an aperture of said diaphragm into plural areas and at least a mirror constituting said mirror means is so positioned that a plane containing the normal line to said mirror is out of a plane which is parallel or perpendicular to said optical modulation element.

4. An image projection apparatus comprising:

color separation means for color-separating light beam from a light source into plural color lights;

optical means for condensing the respective color lights separated by said color separation means;

mirror means provided in the vicinity of at least one of the condensed positions of the respective color lights for guiding the color lights to corresponding reflective optical modulation elements;

deflection means for guiding the light beam to a projection optical system in accordance with at least one of said optical modulation elements; and said projection optical system through which image information in accordance with said optical modulation elements is projected, in mutually superposed manner, onto a predetermined plane, wherein said mirror means and said deflection means are provided in the vicinity of a diaphragm of said projection optical system in such a manner as to divide an aperture of said diaphragm into plural areas and plural mirrors constituting said mirror means are so positioned that planes containing the normal lines to said mirrors are contained in planes which are parallel or perpendicular to said optical modulation elements.

5. An image projection apparatus according to any of claims 1 to 4, wherein said color separation means is composed of a transmissive diffraction grating.

6. An image projection apparatus according to any of claims 1 to 4, wherein said color separation means is composed of a reflective diffraction grating.

7. An image projection apparatus according to any of claims 1 to 4, wherein said color separation means is composed of plural dichroic mirrors positioned in mutually inclined manner.

8. An image projection apparatus according to any of claims 1 to 4, wherein said color separation means is provided in a parallel light beam.

9. An image projection apparatus according to any of claims 1 to 4, wherein said color separation means is adapted to effect color separation in such a manner as to position a green light beam at the center and to position red and blue light beams at the peripheral positions thereof.

10. An image projection apparatus according to claim 6, wherein said reflective diffraction grating is used under the condition of conical diffraction.

11. An image projection apparatus according to claim 7, wherein said plural dichroic mirrors do not have the light beam separating direction in the light beam deflecting plane.

12. An image projection apparatus according to claim 7, wherein, among said plural dichroic mirrors, the last one to receive the light beam is adapted to reflect the green light beam.

13. An image projection apparatus according to claim 1 or 2, wherein said first deflection means includes a mirror or a prism which is adapted to reflect two color lights at both sides among the three color light at both sides among the three color light separated by said color separation means.

14. An image projection apparatus according to claim 1 or 2, wherein said first deflection means includes plural mirrors adapted to reflect the light beams.

15. An image projection apparatus according to claim 1 or 2, wherein said deflection means includes plural prisms adapted to refract the light beams.

16. An image projection apparatus according to claim 1 or 2, wherein said second deflection means includes plural mirror adapted to reflect the light beams.

17. An image projection apparatus according to claim 1 or 2, wherein said second deflection means includes plural prisms adapted to refract the light beams.

18. An image projection apparatus according to any of claims 1 to 4, further comprising a lens system for guiding a parallel light beam to each optical modulation element, in the optical path for each of said color lights.

19. An image projection apparatus according to any of claims 1 to 4, wherein at least one among said optical modulation elements is adapted to receive the light beam in an oblique direction.

20. An image projection apparatus according to claim 2, 3 or 4, wherein said reflective optical modulation elements have a rectangular shape, and at least one of said optical modulation elements receives the light beam in an oblique direction with respect to the longer side and the shorter side of said rectangular shape.

21. An image projection apparatus according to claim 3 or 4, wherein said mirror means includes a mirror of high reflectivity optimized to the wavelength region to be reflected.

22. An image projection apparatus according to claim 14, wherein said plural mirrors includes mirrors of high reflectivity optimized to the wavelength regions to be reflected.

23. An image projection apparatus according to claim 1 or 2, wherein said second deflection means includes plural mirrors which are mutually spaced and mutually inclined.

24. An image projection apparatus according to claim 1 or 2, wherein said second deflection means includes plural mirrors which are mutually spaced and mutually inclined, and at least one of said plural color lights enters said projection optical system through a gap between the mutually spaced mirrors.

25. An image projection apparatus according to claim 1 or 2, wherein said second deflection means includes plural mirrors which are mutually spaced and mutually inclined, and at least one of said plural color lights is reflected by one of the plural mirrors and enters said projection optical system.

26. An image projection apparatus according to claim 1, 2, 3 or 4, wherein said second deflection means includes two mirrors which are mutually spaced and positioned at a mutual angle other than 90°.

27. An image projection apparatus according to any of claims 1 to 4, further comprising, in the optical path for each of said color lights, a lens for condensing the light from each of said optical modulation elements in the vicinity of the diaphragm of said projection optical system.

28. An image projection apparatus comprising:

color separation means for color-separating light beam from a light source into color lights which consists of a red light beam, a green light beam and a blue light beam;

optical means for condensing the color lights separated by said color separation means;

first deflection means provided in the vicinity of at least one of the condensed positions of the respective color lights for guiding the color lights to corresponding reflective optical modulation elements;

second deflection means for guiding the light beam to a projection optical system in accordance with at least one of said optical modulation elements; and said projection optical system through which image information is projected, in mutually superposed manner, onto a predetermined plane, wherein said color separation means is so provided as to separate the red and blue light beams on both sides of the green light beam at the center, while said second deflection means is provided in the vicinity of the diaphragm of said projection optical system in such a manner as to divide the aperture of said diaphragm into three areas, and the green light beam passes through the central one of said divided three areas while the red and blue light beams pass through the peripheral ones thereof.

29. An image projection apparatus comprising:

condensing means for condensing a light beam from a light source into plural color lights;

an integrator having a first end face for receiving said light beam and causing said light beam to emerge from a second end face;

color separation means for color-separating light beam from a light source into plural color lights;

optical means for condensing the color lights separated by said color separation means;

mirror means provided in the vicinity of at least one of the condensed positions of the respective color lights for guiding the color lights to corresponding optical modulation elements;

deflection means for guiding the light beam to a projection optical system in accordance with at least one of said optical modulation elements; and said projection optical system through which image information in accordance with said optical modulation elements is projected, in mutually superposed manner, onto a predetermined plane, wherein said mirror means and said deflection means are provided in the vicinity of a diaphragm of said projection optical system in such a manner as to divide an aperture of said diaphragm into plural areas, said integrator is composed of reflective faces connecting said first and second end faces, and an optical system provided in the optical path between said second end face and said optical modulation elements maintains said first end face and the diaphragm of said projection optical system in an optically conjugate relationship and also maintains said second end face and said second optical modulation elements in an optically conjugate relationship.

30. An image projection apparatus according to claim 29, wherein the light beam from each of said optical modulation elements is condensed, by a lens provided for each optical modulation element, in the vicinity of the diaphragm of said projection optical system.

31. An image projection apparatus according to claim 30, wherein said integrator consists of a hexahedral glass block, wherein a part of the light entering from a first end face of said integrator is guided by total reflection to a second end face thereof.

32. An image projection apparatus according to claim 29 or 30, wherein said integrator consists of a kaleidoscope including four or more trapezoidal or rectangular flat mirrors, wherein a part of the light entering from a first end face of said integrator is reflected by said flat mirrors and guided to a second end face thereof.

33. An image projection apparatus according to claim 1, wherein said optical modulation element is formed with a polymer dispersion liquid crystal apparatus.

34. An image projection apparatus according to claim 2, 3 or 4, wherein said optical modulation element is formed with a reflective polymer dispersion liquid crystal apparatus.

35. An image projection apparatus according to claim 3 or 4, wherein said color separation means comprises a diffraction grating and wherein said mirror means is adapted to compensate the difference in the diffraction angle of the diffraction grating constituting said color separation means, depending on the peak wavelength of the diffracted light beam, thereby guiding the light beams to the respective optical modulation elements at the same inclination angle.

36. An image projection apparatus according to claim 1, 2, 3 or 4, wherein the diaphragm of said projection optical system is positioned between said projection optical system and said optical modulation elements.

37. An image projection apparatus according to claim 1 or 2, wherein said first deflection means and said second deflection means are provided separately and respectively for an area and the other area formed by dividing the aperture of the diaphragm of said projection optical system into two areas.

38. An image projection apparatus according to claim 1 or 2, wherein said first deflection means and said second deflection means are provided separately and respectively for an area and the other area formed by dividing the aperture of the diaphragm of said projection optical system into two areas containing the optical axis of said projection optical system.

39. An image projection apparatus according to claim 3, 4 or 29, wherein said mirror means and said deflection means are provided separately and respectively for an area and the other area formed by dividing the aperture of the diaphragm of said projection optical system into two areas.

40. An image projection apparatus according to claim 3, 4 or 29, wherein said mirror means and said deflection means are provided separately and respectively for an area and the other area formed by dividing the aperture of the diaphragm of said projection optical system into two areas containing the optical axis of said projection optical system.

41. An image projection apparatus according to claim 3 or 4, wherein said deflection means includes plural mirror adapted to reflect the light beams.

42. An image projection apparatus according to claim 3 or 4, wherein said deflection means includes plural prisms adapted to refract the light beams.

43. An image projection apparatus according to claim 3 or 4, wherein said deflection means includes plural mirrors which are mutually spaced and mutually inclined.

44. An image projection apparatus according to claim 3 or 4, wherein said deflection means includes plural mirrors which are mutually spaced and mutually inclined, and at least one of said plural color lights enters said projection optical system through a gap between the mutually spaced mirrors.

45. An image projection apparatus according to claim 3 or 4, wherein said deflection means includes plural mirrors which are mutually spaced and mutually inclined, and at least one of said plural color lights is reflected by one of the plural mirrors and enters said projection optical system.

46. An image projection apparatus according to claim 3 or 4, wherein said mirror means and said deflection means are provided separately and respectively for an area and the other area formed by dividing the aperture of the diaphragm of said projection optical system into two areas containing the optical axis of said projection optical system.

47. A color separation optical system comprising plural dichroic mirrors provided in mutually inclined manner and adapted to separate an incident light beam into plural color lights and to emit thus separated color lights, wherein said plural dichroic mirrors are positioned so that a plane of incidence of the incident light beam is not parallel with a direction along which the separated plural color lights are arranged.

48. A color separation optical system comprising plural dichroic mirrors provided in mutually inclined manner and adapted to separate an incident light beam into plural color lights and to emit thus separated color lights, wherein said plural dichroic mirrors are positioned so that a plane of incidence of the incident light beam is not parallel with a direction along which the separated plural color lights are arranged, and one of said plural dichroic mirrors which last receives the light beam is adapted to reflect a green light beam.

49. An image projection apparatus comprising a color separation optical system according to claim 47 or 48.

* * * * *

UNITED STATES PATENT AND TRADEMARK OFFICE
CERTIFICATE OF CORRECTION

PATENT NO.     : 6,176,585 B1                                            Page 1 of 1
DATED          : January 23, 2001
INVENTOR(S)    : Osamu Koyama et al.

It is certified that error appears in the above-identified patent and that said Letters Patent is hereby corrected as shown below:

Title page,
Item [75], the addresses for the inventors should read as follows:
-- Osamu Koyama, Tokyo, Japan; Junko Kuramochi, Kanagawa-ken, Japan; and Saburo Sugawara, Kanagawa-ken, Japan --

Column 1,
Line 57, "341" should read -- 34' --
Line 59, "341" should read -- 34' --

Signed and Sealed this

Second Day of July, 2002

*Attest:*

JAMES E. ROGAN
*Attesting Officer*         *Director of the United States Patent and Trademark Office*